United States Patent
Kato et al.

(10) Patent No.: US 7,100,010 B2
(45) Date of Patent: Aug. 29, 2006

(54) TAPE DRIVE APPARATUS, RECORDING AND/OR REPRODUCING METHOD, AND RECORDING MEDIUM

(75) Inventors: Tatsuya Kato, Kanagawa (JP); Masaki Yoshida, Tokyo (JP); Katsumi Ikeda, Kanagawa (JP); Yoshihisa Takayama, Kanagawa (JP)

(73) Assignee: Sony Corporation, Tokyo (JP)

( * ) Notice: Subject to any disclaimer, the term of this patent is extended or adjusted under 35 U.S.C. 154(b) by 269 days.

(21) Appl. No.: 10/748,288

(22) Filed: Dec. 31, 2003

(65) Prior Publication Data

US 2004/0190178 A1    Sep. 30, 2004

(30) Foreign Application Priority Data

Jan. 7, 2003    (JP) .................... P2003-001005

(51) Int. Cl.
*G06F 12/14*    (2006.01)
(52) U.S. Cl. ..................... 711/163; 360/60
(58) Field of Classification Search ........... 713/193; 360/60, 69, 132; 369/30; 235/382, 385; 711/163
See application file for complete search history.

(56) References Cited

U.S. PATENT DOCUMENTS

| | | | | |
|---|---|---|---|---|
| 4,338,644 A | * | 7/1982 | Staar | 360/132 |
| 4,960,982 A | * | 10/1990 | Takahira | 235/382 |
| 5,303,214 A | * | 4/1994 | Kulakowski et al. | 369/30.3 |
| 5,455,409 A | * | 10/1995 | Smith et al. | 235/385 |
| 5,493,455 A | * | 2/1996 | Miyoshi et al. | 360/60 |
| 2002/0035695 A1 | * | 3/2002 | Riches et al. | 713/193 |
| 2002/0191322 A1 | * | 12/2002 | Jerman | 360/69 |

FOREIGN PATENT DOCUMENTS

JP         9-237474        9/1997

* cited by examiner

*Primary Examiner*—Pierre Bataille
*Assistant Examiner*—Paul Schlie
(74) *Attorney, Agent, or Firm*—Rader, Fishman & Grauer PLLC; Ronald P. Kananen

(57) ABSTRACT

A tape cassette of this invention is equipped with a memory capable of accommodating management information. Where the tape cassette is used, a MIC mode switch is written to a predetermined area on the magnetic tape held in the cassette. That item of information specifies whether or not the use of the management information held in the memory is mandatory upon write or read operations to or from the magnetic tape. A check is made on the consistency between the MIC mode switch read from the magnetic tape on the one hand and a result of access to the memory on the other hand. If an inconsistency is detected, that is interpreted as something fraudulent having been committed on the tape cassette. In such a case, read and write operations on the illegitimate cassette are restricted. This improves security of a tape drive system running the tape cassette.

12 Claims, 16 Drawing Sheets

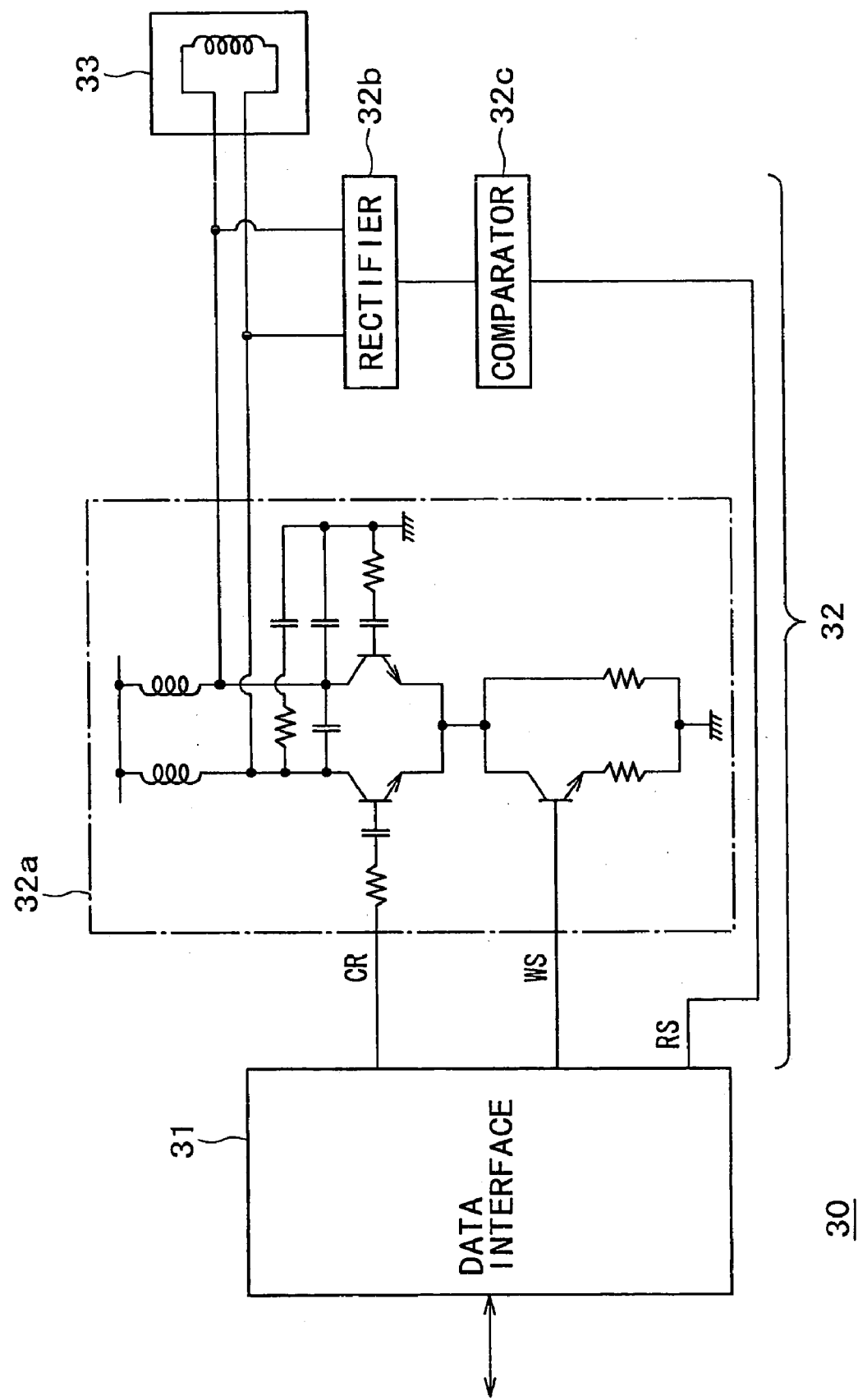

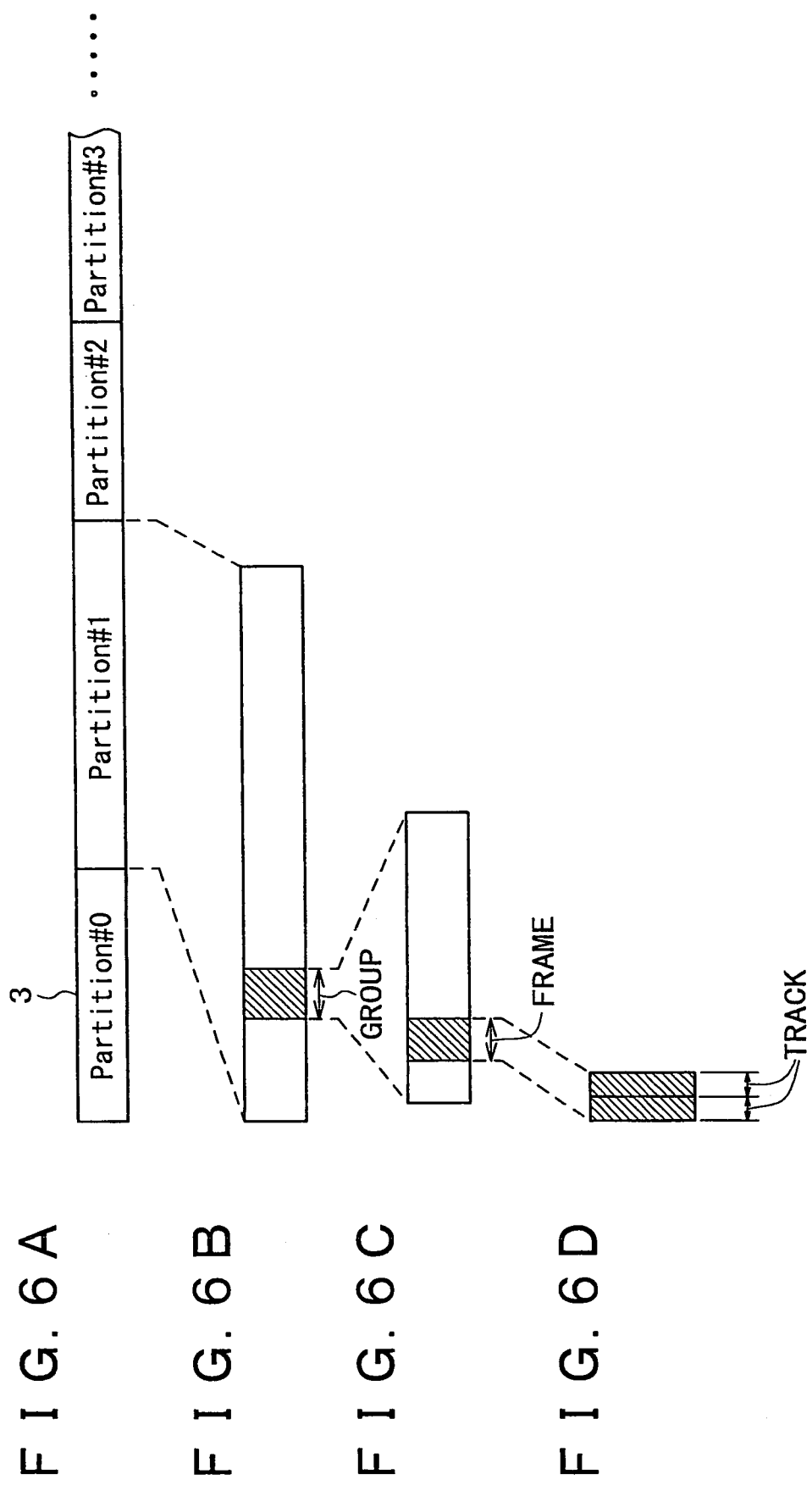
F I G. 6A
F I G. 6B
F I G. 6C
F I G. 6D

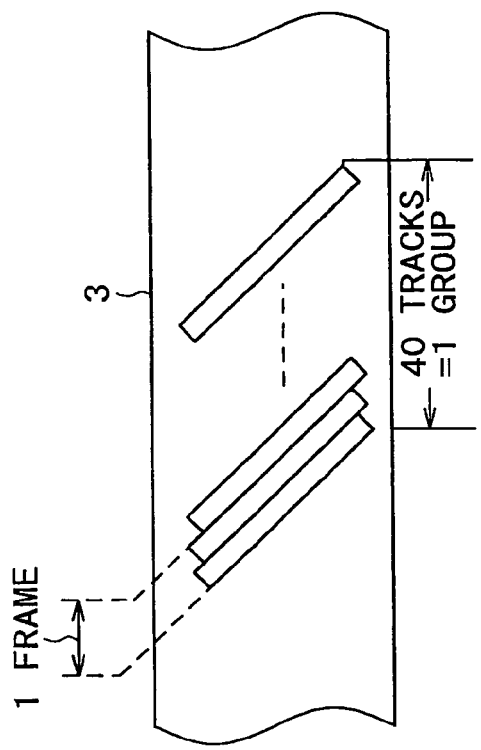
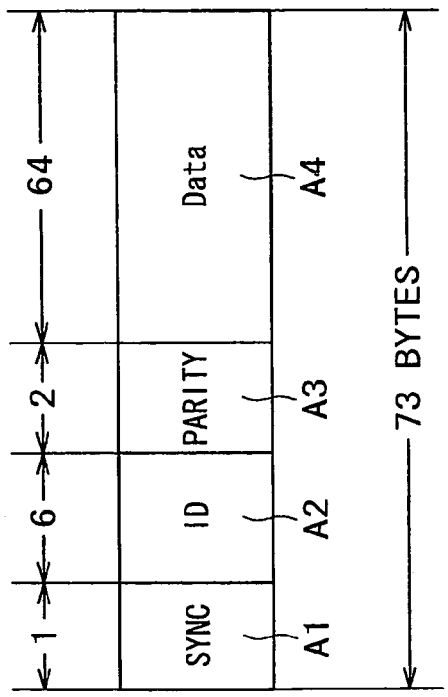
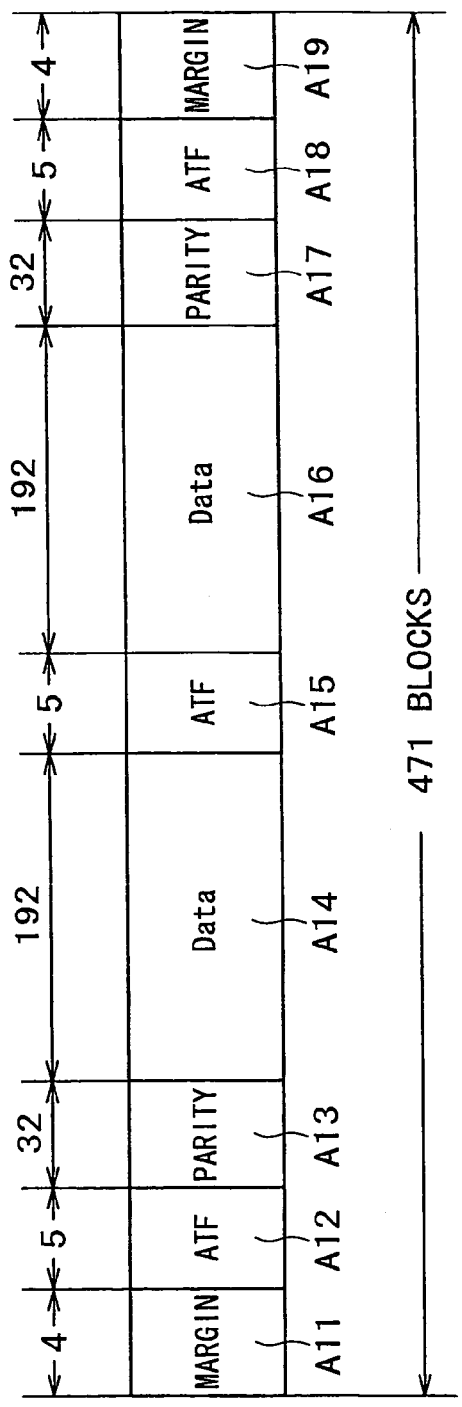

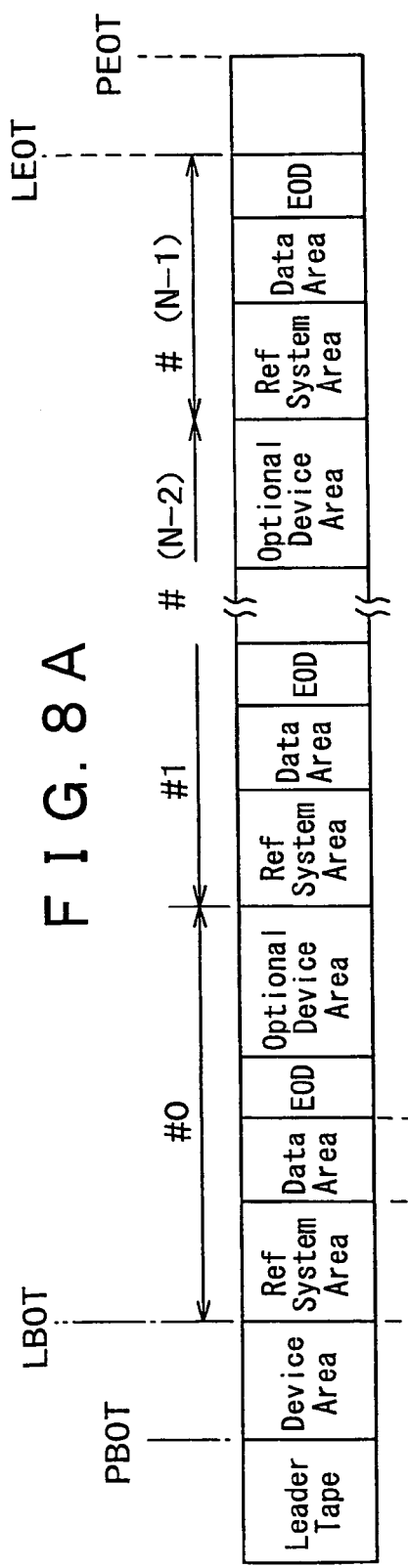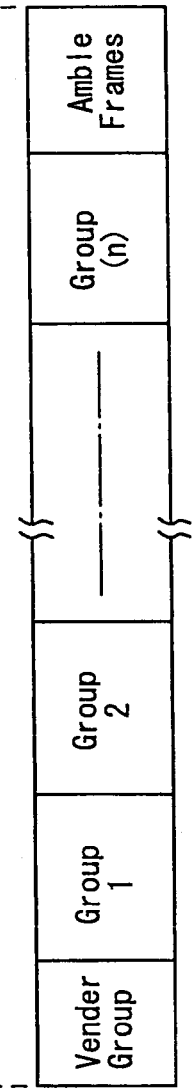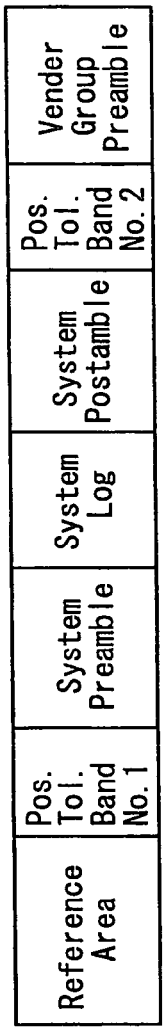
FIG. 8A
FIG. 8B
FIG. 8C

FIG. 9

| | |
|---|---|
| MANUFACTURE PART | (96bytes) |
| SIGNATURE | (64bytes) |
| CARTRIDGE SERIAL NUMBER | (32bytes) |
| CARTRIDGE SERIAL NUMBER CRC | (16bytes) |
| SCRATCH PAD MEMORY | (16bytes) |
| MECHANISM ERROR LOG | (16bytes) |
| MECHANISM COUNTER | (16bytes) |
| LAST 11 DRIVE LIST | (48bytes) |
| DRIVE INITIALIZE PART | (16bytes) |
| VOLUME INFORMATION | (112bytes) |
| ACCUMULATIVE SYSTEM LOG | (64bytes) |
| VOLUME TAG | (528bytes) |

Rows above: MIC HEADER (FL1-3)

| |
|---|
| PARTITION INFORMATION CELL #0 |
| PARTITION INFORMATION CELL #1 |
| ⋮ |
| USER PARTITION NOTE CELL #1 |
| USER PARTITION NOTE CELL #0 |
| USER VOLUME NOTE CELL |
| SUPER-HIGH SPEED SEARCH MAP CELL |

Rows above: MEMORY FREE POOL (FL4)

FIG. 10

| | | |
|---|---|---|
| ↑ | manufacture part checksum | 1byte |
| | mic type | 1byte |
| | mic manufacture date | 4bytes |
| | mic manufacture line name | 8bytes |
| | mic manufacture plant name | 8bytes |
| | mic manufacturer name | 8bytes |
| | mic name | 8bytes |
| | cassette manufactured date | 4bytes |
| | cassette manufacturer line name | 8bytes |
| | cassette manufacturer plant name | 8bytes |
| Manufacture Part | cassette manufacturer name | 8bytes |
| | cassette name | 8bytes |
| | oem customer name | 8bytes |
| | physical tape characteristic ID | 2bytes |
| | maximum clock frequency | 2bytes |
| | block size | 1byte |
| | mic capacity | 1byte |
| | write protect top address | 2bytes |
| | write protect count | 2bytes |
| | reserved | 1byte |
| | application ID | 1byte |
| ↓ | offset | 2bytes |

| Drive Initialize Part | Drive Initialize Part Checksum | 1byte |
| --- | --- | --- |
| | MIC Logical Format Type | 1byte |
| | Super high speed search map Pointer | 2bytes |
| | User Volume Note Cell Pointer | 2bytes |
| | User Partition Note Cell Pointer | 2bytes |
| | Partition Information Cell Pointer | 2bytes |
| | Reserved | 1byte |
| | Volume Attribute Flags | 1byte |
| | Free Pool Top Address | 2bytes |
| | Free Pool Bottom Address | 2bytes |

FIG. 14

| | | | |
|---|---|---|---|
| MIC Mode Switch | 1 Byte | MIC Mode Switch | |
| Reserved | 3 Bytes | Set to all ZERO | |
| Physical Tape Characteristic ID | 2 Bytes | Bit 15 | Enable Bit |
| | | Bit 14 | Magnetic Layer |
| | | Bit 13,12 | Applied Read Head |
| | | Bit 11 | Use Extension Area Bit |
| | | Bit 10,9,8 | Tape Type |
| | | Bit 7,6 | Tape Thickness |
| | | Bit 5,4,3,2,1,0 | Tape Length/5 |
| Flags | 1 Byte | Bit 7,6,5 | Reserved.Set to all ZERO |
| | | Bit 4 | Super High Speed Search Enable Flag |
| | | Bit 3,2 | System Log Allocation Flag |
| | | Bit 1 | Always Unload PBOT Flag |
| | | Bit 0 | DDS Emulation Flag |
| Last Partition Number | 1 Byte | Last Valid Partition Number | |
| Device Area Map | 32 Bytes | Device Area Map (MSB First) | |
| Reserved | 32 Bytes | Set to all ZERO | |

FIG. 15

MIC Mode Switch

| Value | Definition |
|---|---|
| 0 | Normal Use. If a drive can't recognize MIC, it uses data of tape. |
| The other value | Only use MIC data. |

TAPE DRIVE APPARATUS, RECORDING AND/OR REPRODUCING METHOD, AND RECORDING MEDIUM

BACKGROUND OF THE INVENTION

The present invention relates to a recording medium in the form of a tape cassette containing a magnetic tape, a tape drive apparatus capable of recording and/or reproducing information to and/or from the tape cassette, and a recording and/or reproducing method for use with the tape drive apparatus.

Tape streamer drives are a well-known drive apparatus for recording and reproducing digital data to and from a magnetic tape serving as a recording medium held in a tape cassette. Depending on the tape length of the tape cassette they use, some tape streamer drives can record large quantities of data amounting to tens to hundreds of gigabytes. Their mass storage capability allows the tape streamer drives to be utilized extensively in diverse applications including the backup of data recorded illustratively on hard discs in the computer body and the storage of picture data and other massive data.

In a data storage system made up of such a tape streamer drive and a tape cassette containing a magnetic tape, management information or the like is needed for the drive to manage appropriately its recording and/or reproduction of data to and/or from the magnetic tape. The management information includes information about diverse locations on the magnetic tape as well as a use history of the tape.

A management information area is located at the beginning of the magnetic tape or at the beginning of each of the partitions formed along the tape. Before writing or reproducing data to or from the magnetic tape, the tape streamer drive gains access to the management information area to read necessary management information therefrom. Based on the management information thus retrieved, the tape streamer drive performs various processes allowing subsequent recording or reproducing operations to proceed appropriately.

At the end of the data recording or reproduction of data, the tape streamer drive again accesses the management information area to update the relevant information therein in a manner reflecting any changes resulting from the preceding recording or reproducing operation. The updates are carried out to prepare for the next recording or reproducing operation. Thereafter, the tape cassette is unloaded and ejected from the tape streamer drive.

Where recording and/or reproduction is performed on the basis of such management information, the tape streamer drive is required twice to access the management information area at the beginning of the magnetic tape or of one of its partitions: first, before the operation is started, and later, when the operation has ended, so that the relevant data should be written to and read from the area each time. In other words, the tape cassette cannot be loaded or unloaded halfway through the recording or reproducing operation along the magnetic tape.

Upon access to the management information area, the tape streamer drive is required physically to feed the magnetic tape. That means it takes some time to access the beginning of the magnetic tape or one of its partitions. In particular, if the recording or reproducing operation on the magnetic tape ends at a considerable physical distance from the management information area, it takes a correspondingly long time to feed the tape before the target area can be reached.

As described, data storage systems that utilize tape cassettes as their recording media require a relatively long access time before a single write or read operation is completed, i.e., from the time the magnetic tape was loaded until it is unloaded. It is obviously preferable to minimize the time required for such a series of access-related operations.

For that purpose, techniques have been proposed whereby a nonvolatile memory is installed within a tape cassette enclosure so that the memory may accommodate management information (refer illustratively to Japanese Patent Laid-Open No. Hei 9-237474).

The tape streamer drive for use with such a memory-equipped tape cassette incorporates an interface for writing and reading management information to and from the nonvolatile memory, i.e., information about the recording and reproduction of data to and from the magnetic tape.

The above arrangement eliminates the need illustratively to rewind the magnetic tape at the time of loading or unloading of the cassette. That is, the tape cassette may be loaded or unloaded halfway through the ongoing operation along the tape.

The above-mentioned nonvolatile memory was attached to the tape cassette initially as an auxiliary memory to gain advantages such as the shortened access time. Even if such a nonvolatile memory is not utilized, however, normal-use cassette tapes still permit writing and reading of data thereto and therefrom. If the nonvolatile memory is to be employed for more specific purposes, it is possible to conceive various types of tape cassettes for special uses.

The tape cassettes for one of such special purposes are illustratively those to which data are recorded only once. Once recorded on the tape, the data can only be read and not overwritten. This tape cassette feature is called WORM (Write Once Read Many). The WORM feature is also provided to disc type recording media, such as CD-Rs and DVD-Rs.

On a WORM tape cassette, data can only be read from the data-recorded areas and no data can be written thereto. History information about the read and other operations on the tape cannot be updated in a manner causing any management information area associated with the recorded areas to reflect the past changes. Such history information can only be written to the nonvolatile memory in the tape cassette. That is, where a WORM tape cassette is subject to the recording and/or reproduction of data, it is mandatory to use the management information held in the nonvolatile memory of the cassette, and not any management information recorded on the magnetic tape.

If the presence of a nonvolatile memory in a cassette is assumed as a prerequisite, it is possible to come up with tape cassettes for various special purposes that necessitate the mandatory use of that memory. In particular, special-use tape cassettes are suited for applications that require restricting the recording or reproduction of data to or from the magnetic tape. The data to be recorded on the magnetic tape housed in such special-use tape cassettes often demand much higher security than the data to be accommodated by normal-use tape cassettes.

Illustratively, WORM tape cassettes are actually utilized most often for the recording of important data that call for secure measures to maintain their high storage value, given the premise that recorded data can only be read and neither overwritten nor erased. Hence, the high levels of security that are demanded by and offered to the data accommodated by the WORM tape cassettes.

As described, special-use tape cassettes typified by the WORM tape cassette above serve their purposes when each is furnished with a nonvolatile memory. The memory is physically placed illustratively inside the tape cassette enclosure.

That structure raises the possibility of fraud: the nonvolatile memory within a special-use tape cassette could be replaced with an illegally procured memory, whereby the WORM feature could be disabled. This tampering could lead to falsification of data recorded on the magnetic tape.

Such an eventuality requires additional suitable measures to prevent the fraud illustratively involving illegal replacement of the nonvolatile memory, before the special-use tape cassettes can be actually marketed.

SUMMARY OF THE INVENTION

In solving the foregoing and other problems of the related art and according to one aspect of the invention, there is provided a tape drive apparatus including: a tape-oriented recording and/or reproducing element for recording and/or reproducing information to and/or from a magnetic tape housed in a tape cassette furnished as a recording medium, the tape cassette being loaded in the apparatus; a memory accessing element for accessing a memory which may be incorporated in the tape cassette furnished as the recording medium and which holds management information for write and/or read operations to and/or from the magnetic tape, the memory accessing element writing and/or reading information to and/or from the memory following the accessing; an information acquiring element for acquiring conditional information from the magnetic tape by causing the tape-oriented recording and/or reproducing element to reproduce from the tape the conditional information indicating whether it is mandatory to use the management information in the memory upon writing and/or reading information to and/or from the magnetic tape; and an operation controlling element which, based at least on consistency between specifics of the acquired conditional information and a result of suitable access to the memory by the memory accessing element, controls a write and/or a read operation on the magnetic tape.

According to another aspect of the invention, there is provided a recording and/or reproducing method for use with a tape drive apparatus, the method comprising the steps of: recording and/or reproducing information to and/or from a magnetic tape housed in a tape cassette furnished as a recording medium, the tape cassette being loaded in the apparatus; accessing a memory which may be included in the tape cassette furnished as the recording medium and which holds management information for write and/or read operations to and/or from the magnetic tape, the memory accessing step writing and/or reading information to and/or from the memory following the accessing; acquiring conditional information from the magnetic tape by causing the recording and/or reproducing step to reproduce from the tape the conditional information indicating whether it is mandatory to use the management information in the memory upon writing and/or reading information to and/or from the magnetic tape; and based at least on consistency between specifics of the acquired conditional information and a result of suitable access to the memory in the memory accessing step, controlling a write and/or a read operation on the magnetic tape.

According to a further aspect of the invention, there is provided a recording medium furnished as a tape cassette equipped with a memory and housing a magnetic tape to and/or from which to write and/or read information, wherein the magnetic tape has a predetermined area for accommodating conditional information indicating whether it is mandatory to use management information which is held in the memory and which serves to manage writing and/or reading of information to and/or from the magnetic tape upon writing and/or reading to and/or from the magnetic tape.

The above-described apparatus and method of the invention are used in combination with the inventive recording medium that is a tape cassette housing a magnetic tape and equipped with a memory which holds management information for managing the writing and reading of information to and from the magnetic tape.

As outlined above, a predetermined area on the magnetic tape retains the conditional information indicating whether it is mandatory to use the management information in the memory upon writing and/or reading information to and/or from the magnetic tape. Depending on the consistency checked between the conditional information retrieved from the magnetic tape and a result of suitable access to the memory, write and read operations on the loaded tape cassette are controlled.

When consistency is checked between the conditional information read from the magnetic tape on the one hand and the result of access to the memory on the other hand, that is equivalent to verifying whether there is a match between the magnetic tape revealing specific information (conditional information) and the memory yielding information upon access thereto. If consistency is not confirmed, it is possible to surmise that the tape cassette has been tampered with.

BRIEF DESCRIPTION OF THE DRAWINGS

Further objects and advantages of this invention will become apparent upon a reading of the following description and appended drawings in which:

FIG. 2 is a block diagram of a remote memory interface included in the inventive tape streamer drive;

FIGS. 6A, 6B, 6C and 6D are explanatory views showing a structure of data recorded on a magnetic tape;

FIGS. 7A, 7B and 7C are schematic views depicting a data structure of a single track;

FIGS. 8A, 8B and 8C are explanatory views illustrating an area structure on a magnetic tape;

FIG. 9 is an explanatory view indicating an MIC data structure according to the invention;

FIG. 10 is an explanatory view presenting a manufacture part of the MIC data structure according to the invention;

FIG. 14 is an explanatory view depicting volume information recorded on a magnetic tape housed in the inventive tape cassette;

FIG. 15 is an explanatory view listing definitions of an MIC mode switch; and

DETAILED DESCRIPTION OF THE PREFERRED EMBODIMENTS

Figure 3A:
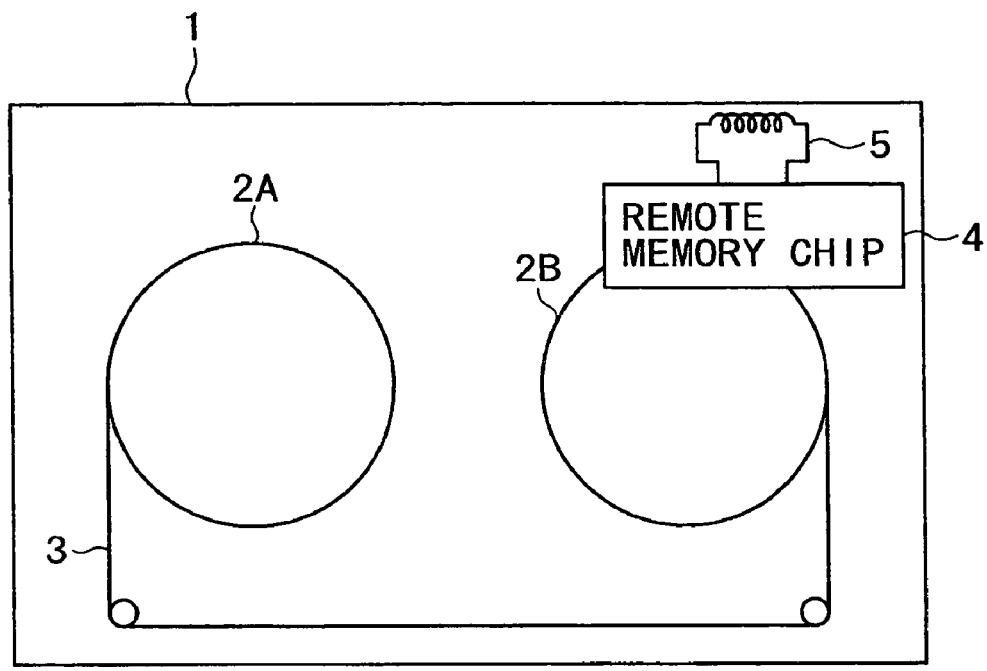
FIGS. 3A and 3B are explanatory views outlining an internal structure of a tape cassette embodying the invention.

Preferred embodiments of this invention will now described with reference to the accompanying drawings. This applicant proposed in the past a number of inventions regarding a nonvolatile memory-equipped tape cassette and a tape drive apparatus (tape streamer drive) capable of recording and reproducing digital data to and from the memory-equipped tape cassette. This invention submitted by the same applicant applies to improvements of the memory-equipped tape cassette and tape streamer drive. The nonvolatile memory attached to the tape cassette according to the invention may be called an MIC (memory in cassette). The description below will be made under the following headings:

1. Structure of the tape cassette
2. Structure of the remote memory chip
3. Structure of the tape streamer drive
4. Magnetic tape format
5. MIC data structure
6. Data structure of system logs on the magnetic tape
7. Fraud preventing measures 1. Structure of the Tape Cassette The tape cassette for use with the tape streamer drive of this invention is described below with reference to FIGS. 3A, 3B and 4. FIG. 3A conceptually depicts an internal structure of a tape cassette equipped with a remote memory chip. Inside the tape cassette 1 are reels 2A and 2B, as illustrated, and a magnetic tape 3 with a tape width of 8 mm is wound around the reels.

The tape cassette 1 contains the remote memory chip 4 incorporating a nonvolatile memory and its control circuits. The remote memory chip 4 is furnished with an antenna 5 that allows the chip 4 to communicate data wirelessly with a remote memory interface 30 of the tape streamer drive, to be discussed later.

The remote memory chip 4 accommodates diverse items of information about each tape cassette: manufacture information, serial number information, a tape thickness, a tape length, a tape material, a history of past uses of recorded data in each of partitions formed along the tape, and user information. These items of information will be described later in more detail. In this specification, the diverse kinds of information held in the remote memory chip 4 are collectively called "management information" because they are used primarily in managing the writing and reading of data to and from the magnetic tape 3.

As outlined above, the nonvolatile memory housed in the tape cassette enclosure stores management information, and the tape streamer drive for use with the tape cassette has the interface for writing and reading relevant management information to and from the nonvolatile memory in connection with write and read operations of data to and from the magnetic tape. This setup permits efficient data recording and reproduction to and from the magnetic tape 3.

Illustratively, the magnetic tape need not be rewound to the tape top upon loading or unloading of the tape cassette. That is, the tape cassette can be loaded or unloaded halfway through the ongoing operation. Data may be edited by updating the management information in the nonvolatile memory as needed. Furthermore, it is easy to form a large number of partitions along the tape and manage them appropriately.

If the tape cassette is designed for some special use, the internal nonvolatile memory inside is arranged to accommodate, as part of management information, use type information representative of the specific use. This arrangement eliminates the need illustratively to form identification holes on the tape cassette enclosure for use identification purposes. Size constraints of the tape cassette enclosure put a physical limit to the number of identification holes that may be formed on the enclosure. On the side of the tape streamer drive, it is not feasible to include a mechanical detection facility for detecting each and every identification hole that could be formed; the holes for identifying numerous uses cannot be dealt with physically. By contrast, a large number of tape cassette uses can be recognized if the management information in the nonvolatile memory is arranged to include relevant information representing the use types in effect, as mentioned above.

Figure 3B:
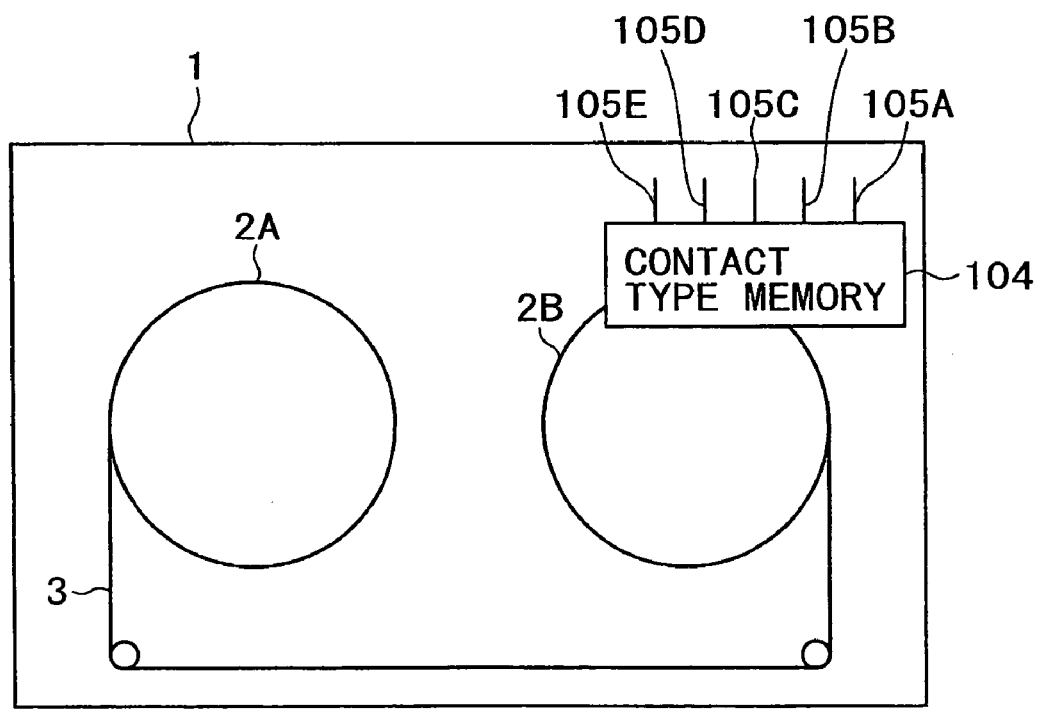

FIG. 3B shows a tape cassette 1 incorporating a contact type memory 104 (nonvolatile memory). In this setup, a module of the contact type memory 104 has five terminals 105A, 105B, 105C, 105D and 105E serving as a power supply terminal, a data input terminal, a clock input terminal, a grounding terminal, and a reserved terminal, respectively. The contact type memory 104 stores the same management information as the remote memory chip 4 described above.

In this specification, the nonvolatile memory housed in the tape cassette is called the MIC, as mentioned above. According to the invention, as can be understood from the above description, there exist two kinds of MIC: a remote memory chip 4, and a contact type memory 104. In the description that follows, the remote memory chip 4 and the contact type memory 104 are collectively called the MIC if there is no specific need to distinguish the two.

Figure 4:
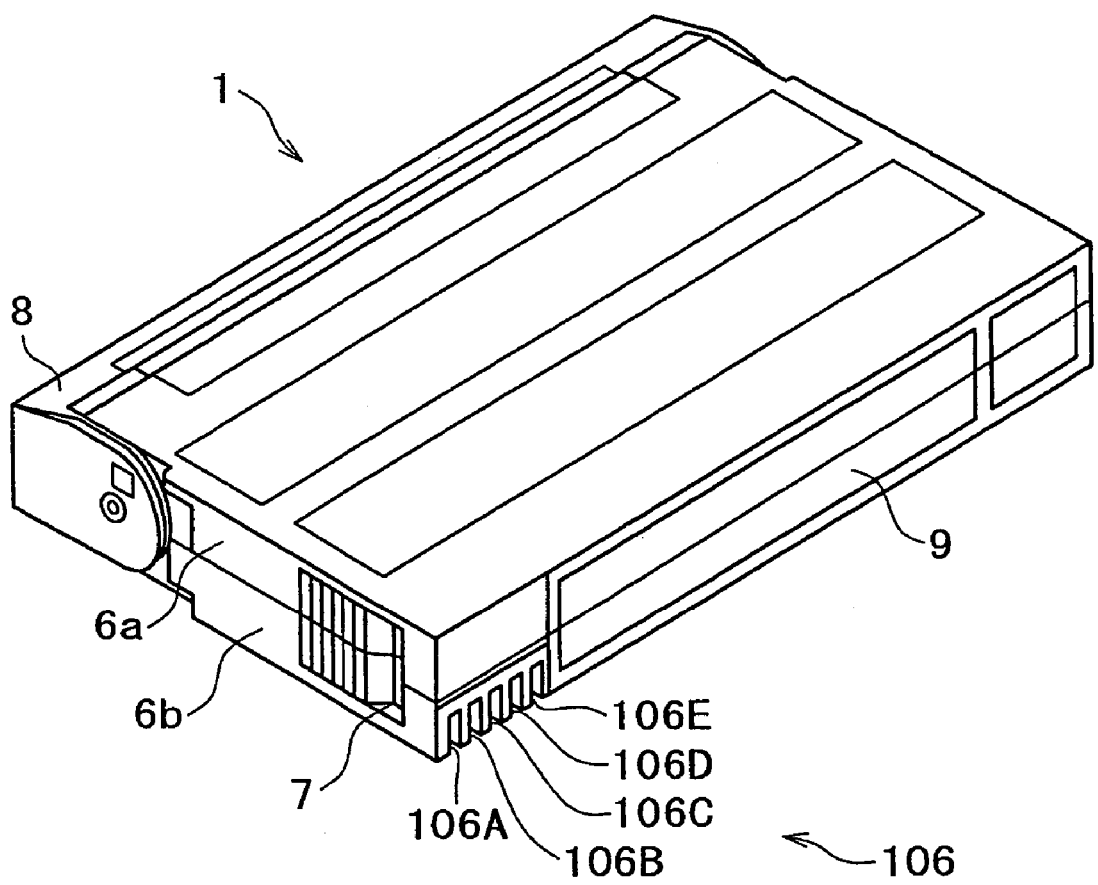
FIG. 4 is a perspective view of the inventive tape cassette.

FIG. 4 depicts an external view of the tape cassette 1 shown in FIG. 3A or 3B. The enclosure as a whole is made up of an upper case 6a, a lower case 6b, and a guard panel 8. The structure is basically the same as that of a tape cassette for use by the ordinary 8-mm VTR.

In proximity to a label face 9 on one side of the tape cassette 1 is a terminal block 106. This is a block that accommodates electrodes of the tape cassette incorporating the contact type memory 104 shown in FIG. 3B. Specifically, the block has terminal pins 106A, 106B, 106C, 106D, and 106E connected respectively to the terminals 105A, 105B, 105C, 105D, and 105E of the memory indicated in FIG. 3B. That is, the tape cassette 1 having the contact type memory 104 exchanges data signals with the tape streamer drive through the terminal pins 106A, 106B, 106C, 106D, and 106E in physical contact with their counterparts of the drive.

Obviously, no terminal pins are needed for the tape cassette having the noncontact remote memory chip 4 as shown in FIG. 3A. Still, the tape cassette has a dummy terminal block 106 to maintain outside shape integrity that ensures compatibility with the tape streamer drive.

Although not shown, a label-like noncontact remote memory chip has been known as part of the related art. The label incorporating a remote memory chip may be attached to a suitable location on the enclosure of the tape cassette 1. When the tape cassette 1 is loaded into the tape streamer drive 10, the remote memory chip pasted on the cassette can communicate with a memory communication block of the drive 10.

2. Structure of the Remote Memory Chip

Figure 5:
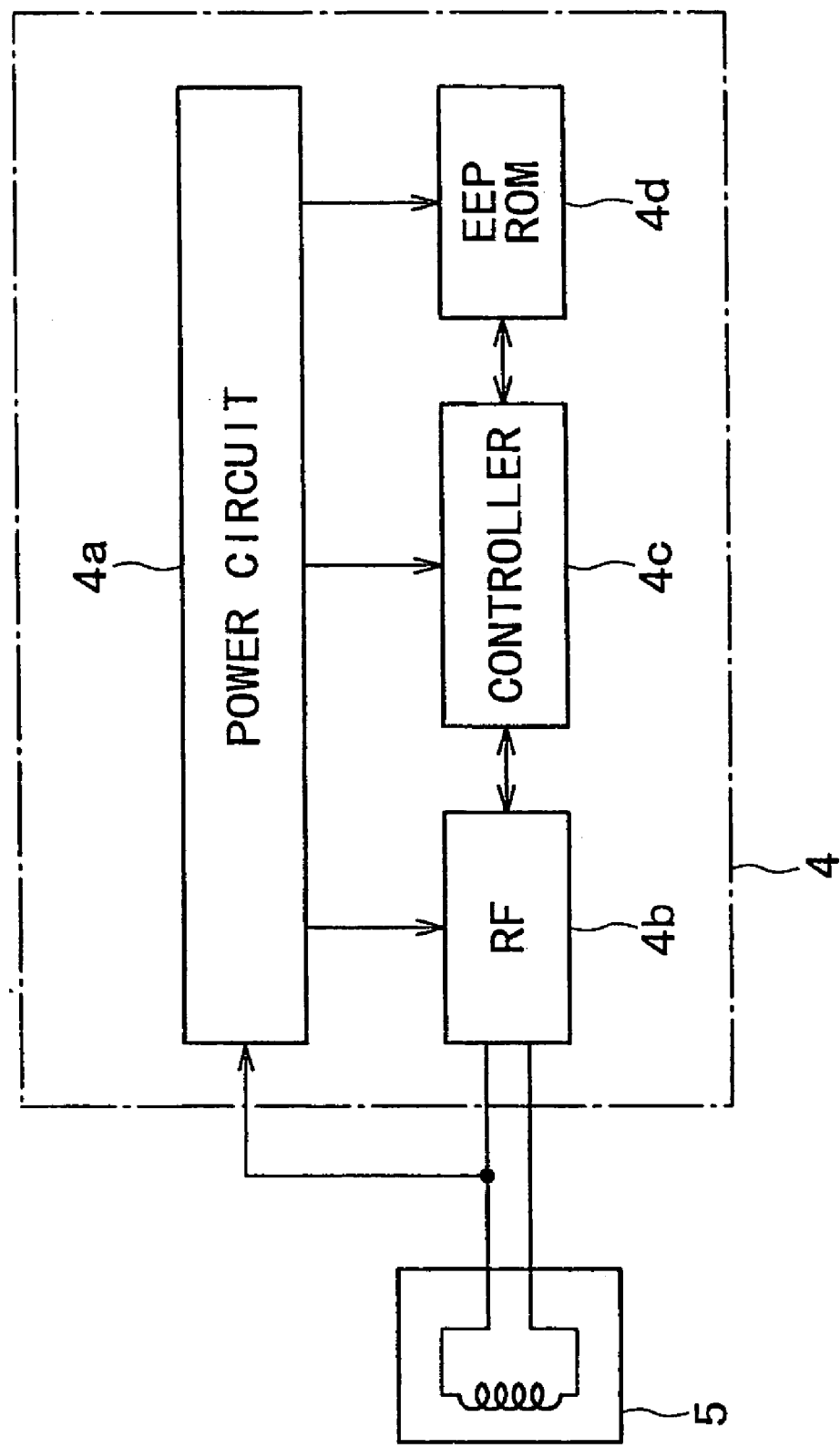
FIG. 5 is a block diagram of a remote memory chip included in the inventive tape cassette.

FIG. 5 shows an internal structure of the remote memory chip 4. Illustratively, the remote memory chip 4 as a semiconductor IC includes a power circuit 4a, an RF processor 4b, a controller 4c, and an EEPROM 4d as shown in FIG. 5. The remote memory chip 4 is mounted illustratively on a printed circuit board secured inside the tape cassette 1. A copper foil portion of the printed circuit board constitutes the antenna 5.

The remote memory chip 4 is powered from the outside in a noncontact fashion. Communication with the tape streamer drive 10, to be described later, utilizes a carrier of, for example, 13 MHz. When radio waves from the tape streamer drive 10 are received by the antenna 5, the power circuit 4a converts the 13-MHz carrier into direct currents. The DC power thus generated is supplied to the RF processor 4b, the controller 4c, and the EEPROM 4d as their operating power.

The RF processor 4b demodulates incoming (received) information and modulates outgoing information. The controller 4c decodes signals received from the RF processor 4b and the controls execution of processes reflecting the decoded information (commands), such as write and read operations to and from the EEPROM 4d.

That is, the remote memory chip 4 is switched on upon receipt of radio waves from the tape streamer drive 10 or from a library device 50. The controller 4c executes the processes designated by commands superposed on the carrier, thereby managing data in the EEPROM 4d, which is a nonvolatile memory.

3. Structure of the Tape Streamer Drive

Figure 1:
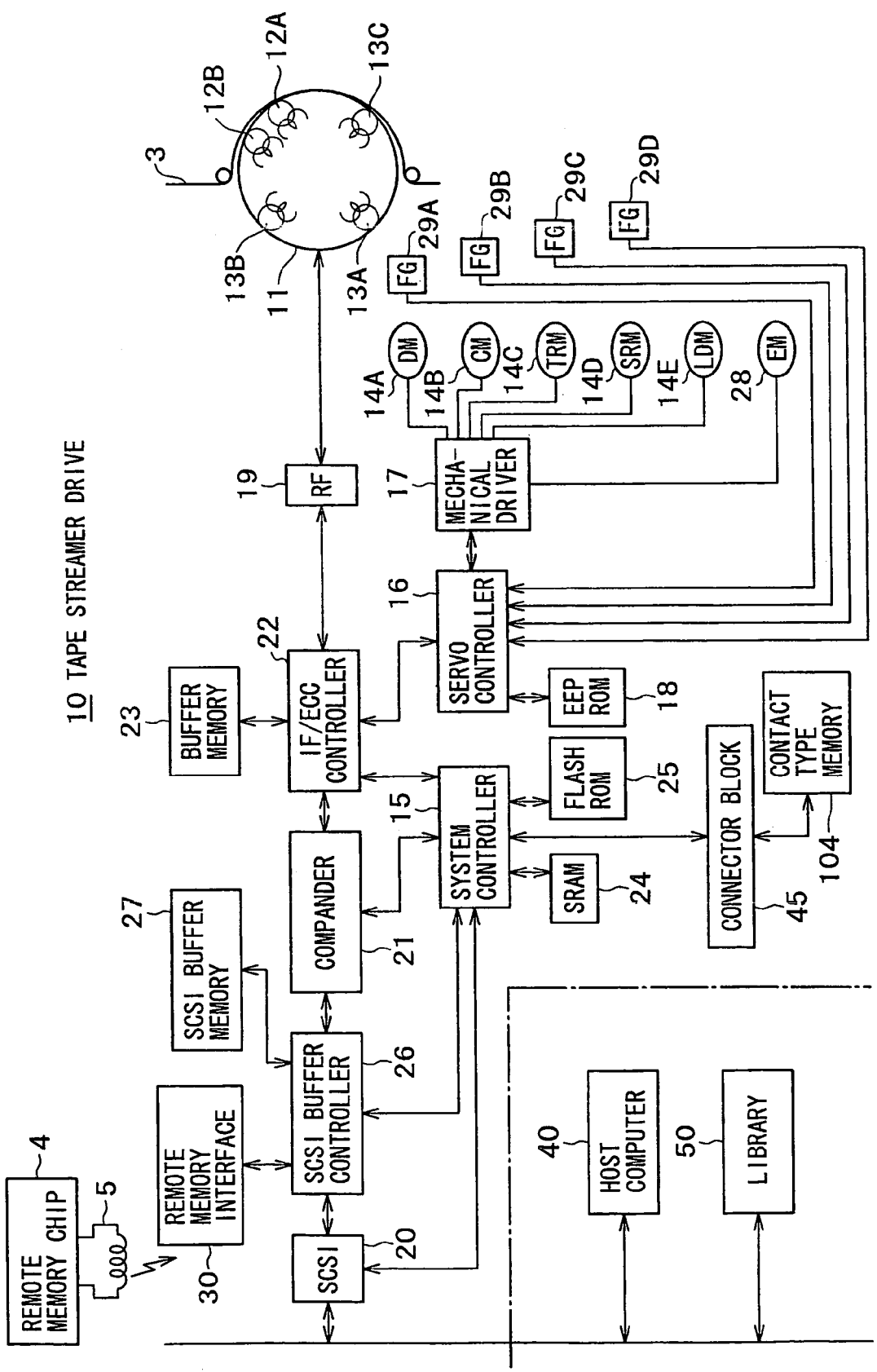
FIG. 1 is block diagram of a tape streamer drive embodying this invention.

Described below with reference to FIG. 1 is a typical structure of the tape streamer drive 10 compatible with the tape cassette 1 equipped with the remote memory chip 4 shown in FIG. 3A. The tape streamer drive 10 operates on the helical scan principle in recording and reproducing data to and from the magnetic tape 3 in the tape cassette 1.

As shown in FIG. 1, a rotary drum 11 illustratively has two write heads 12A and 12B and three read heads 13A, 13B and 13C. The write heads 12A and 12B are structured so that two gaps with different azimuth angles are located in close proximity to each other. The read heads 13A, 13B and 13C are disposed to have their own azimuth angles.

The rotary drum 11 is rotated by a drum motor 14A. The magnetic tape 3 drawn out of the tape cassette 1 is wound around the rotary drum 11, fed by a capstan motor 14B and pinch rollers, not shown. As mentioned above, the magnetic tape 3 is wound around the reels 2A and 2B that are rotated by reel motors 14C and 14D in forward and backward directions, respectively.

A loading motor 14E drives a loading mechanism, not shown, to load and unload the magnetic tape 3 onto and away from the rotary drum 11. An eject motor 28 drives a tape cassette loading mechanism to load and to eject the tape cassette 1.

The drum motor 14A, the capstan motor 14B, the reel motors 14C and 14D, the loading motor 14E, and the eject motor 28 are all driven by power fed from a mechanical driver 17. The mechanical driver 17 drives these motors under control of a servo controller 16. The servo controller 16 controls the rotating speeds of the motors to effect diverse operations: normal tape run for recording or reproduction, tape run for high-speed reproduction, fast forward, and rewind. An EEPROM 18 retains constants and other related data for servo control by the servo controller 16 over the motors.

The drum motor 14A, the capstan motor 14B, the T reel motor 14C, and the S reel motor 14D are each furnished with a frequency generator (FG). These frequency generators detect revolution information about the motors. The detected information is used in servo control by the servo controller 16. More specifically, there are provided a drum FG 29A, a capstan FG 29B, a T reel FG 29C, and a S reel FG 29D for generating frequency pulses in synchronism with the revolutions of the drum motor 14A, the capstan motor 14B, the T reel motor 14C, and the S reel motor 14D respectively. The generator output (i.e., FG pulses) is fed to the servo controller 16.

Given the FG pulses, the servo controller 16 determines the rotating speed of each of the motors, finds an error between a target rotating speed and the actual rotating speed detected of each motor, and applies power to the mechanical driver 16 in accordance with the detected error in a closed-loop rotating speed control setup. In this manner, the servo controller 16 controls the revolutions of the motors in compliance with their target rotating speeds during such operations as normal tape run for recording or reproduction, high-speed search, fast forward, and rewind.

The servo controller 16 is connected bidirectionally with a system controller 15 that controls the system as a whole through an interface controller/ECC formatter 22 (called the IF/ECC controller hereunder).

The tape streamer drive 10 uses an SCSI interface 20 for data input and output. At the time of data recording, for example, data are input consecutively from a host computer 40 through the SCSI interface 20 in data units of a fixed-length record. The input data are sent to a compander (compressor/expander) 21 via an SCSI buffer controller 26 that controls the SCSI interface 20 in data transfers. An SCSI buffer memory 27 is provided as buffering means used by the SCSI buffer controller 26 in causing the SCSI interface 20 to attain necessary transfer rates. The SCSI buffer controller 26 supplies relevant command data to the remote memory interface 30, to be described later, and generates a clock signal for the interface 30 during operation.

This tape streamer drive system also has a mode in which the host computer 40 transmits data in units of a variable collective data length.

The compander 21 compresses input data as needed in a predetermined format. Illustratively, where LZW compression is adopted as the compression method, character strings that have been processed so far are assigned unique codes and stored in the form of a dictionary. When new character strings are input, they are compared with the existing content of the dictionary. If any character strings in the input data match the coded character strings in the dictionary, they are replaced with the corresponding dictionary codes. All unmatched input character strings are assigned new codes and entered into the dictionary. In this manner, input character string data are entered successively into the dictionary and all data that match the existing string data are replaced with the matching codes for data compression.

The output of the compander 21 is sent to the IF/ECC controller 22 which, in its control operation, places the received compander 21 output temporarily into a buffer memory 23. The data stored in the buffer memory 23 are ultimately processed under control of the IF/ECC controller 22 in units of a fixed length equivalent to 40 tracks of the magnetic tape called a group. The resulting data are subjected to an ECC formatting process.

The ECC formatting process involves supplementing write data (data to be written) with ECC (error-correcting code) and modulating the coded data in a manner complying with magnetic recording. The processed data are fed to the RF processor 19.

Given the write data, the RF processor 19 generates write signals by submitting the data to such processes as amplification and write equalizing and sends the generated write signals to the write heads 12A and 12B. The write heads 12A and 12B supplied with the write signals write the data to the magnetic tape 3.

What follows is a brief description of a data read operation. Recorded data are read from the magnetic tape 3 by the read heads 13A and 13B as RF read signals. The read output is subjected to processes such as read equalizing, read clock generation, binarization, and decoding (e.g., Viterbi decoding) by the RF processor 19.

The signals thus read out are fed to the IF/ECC controller 22 first for error correction. After being placed temporarily in the buffer memory 23, the processed data are read therefrom in a suitably timed manner and sent to the compander 21.

If the system controller 15 determines that the data have been compressed, the compander 21 expands the data accordingly; if the system controller 15 finds that the data are not compressed, then the compander 21 allows the data to be output unmodified. The output data from the compander 21 are output to the host computer 40 as reproduced data via the SCSI buffer controller 26 and SCSI interface 20.

FIG. 1 also shows the remote memory chip 4 housed in the tape cassette 1. When the tape cassette 1 is loaded into the tape streamer drive, the remote memory chip 4 enters into a state of readiness to exchange data with the system controller 15 in a noncontact manner via the remote memory interface 30.

FIG. 2 depicts a typical structure of the remote memory interface 30. A data interface 31 is provided to permit data exchanges with the system controller 15. As will be discussed later, a data transfer to the remote memory chip 4 takes place in the form of a command from the apparatus and an acknowledgment of that command by the remote memory chip 4. When the system controller 15 issues a command to the remote memory chip 4, the data interface 31 receives command data and a clock signal from the SCSI buffer controller 26. In keeping with the clock, the data interface 31 feeds the command data to an RF interface 32. The data interface 31 also supplies a carrier frequency CR (13 MHz) to the RF interface 32.

As shown in FIG. 2, the RF interface 32 includes an RF modulator/amplifier 32a that modulates in amplitude (100 kHz) the command (outgoing data) WS and superposes the modulated command onto the carrier frequency CR. After the modulation and amplification, the resulting signal is sent to an antenna 33.

The RF modulator/amplifier 32a causes the command data to be transmitted wirelessly from the antenna 33 to the antenna 5 inside the tape cassette 1. As discussed above with reference to FIG. 5, the circuitry in the tape cassette 1 is switched on upon receipt of the command data by the antenna 5. In keeping with what is designated by the command, the controller 4c carries out the corresponding operation. Illustratively, the data transmitted along with a write command are written to the EEPROM 4d under control of the controller 4c.

When the remote memory interface 30 issues a command, the remote memory chip 4 acknowledges it. More specifically, the controller 4c of the remote memory chip 4 causes the RF processor 4b to modulate and amplify acknowledgment data before transmitting the acknowledgment from the antenna 5.

Upon receipt of the acknowledgment by the antenna 33, the received signal is rectified by a rectifier 32b before being demodulated by a comparator 32c into data. The demodulated data are sent through the data interface 31 to the system controller 15. Illustratively, if the system controller 15 issues a read command to the remote memory chip 4, the remote memory chip 4 returns data retrieved from the EEPROM 4d along with a code acknowledging the received command. The acknowledgment code and the retrieved data are received and demodulated by the remote memory interface 30 before being forwarded to the system controller 15.

As described, the tape streamer drive 10 using the remote memory interface 30 can gain access in noncontact fashion to the remote memory chip 4 inside the tape cassette 1. In the noncontact data exchanges above, the data are modulated in amplitude at 100 kHz and superposed onto the 13-MHz carrier. The initial data are packetized for the exchange. More specifically, the data in the form of a command and an acknowledgment are supplemented with a header, a parity code and other necessary information before being packetized. The packetized data are subjected first to code conversion and then to modulation, whereby stable RF signals are generated for transmission and reception. The techniques for implementing the noncontact interface described above were submitted earlier by this applicant and were granted a patent (Japanese Patent No. 2550931).

A SRAM 24 and a flash ROM 25 shown in FIG. 1 hold data for use by the system controller 15 in various processes. For example, the flash ROM 25 retains constants used for control purposes. The SRAM 24 is utilized as a work memory or as a memory that accommodates data from the MIC (remote memory chip 4 or contact type memory 104), data to be written to the MIC, mode data set in units of a tape cassette, and various flag data. The SRAM 24 also serves to let the stored data therein be operated on.

The flash ROM 25 provided as firmware retains such diverse items of information as data write/read retry counts, write current values for use by the RF processor 19, and equalizer characteristics. When the tape cassette is loaded, the tape streamer drive 10 can execute controls based on the settings held in this firmware.

The SRAM 24 and the flash ROM 25 may be furnished as internal memories of a microcomputer constituting the system controller 15. Part of the areas in the buffer memory 23 may alternatively be used as a work memory.

As shown in FIG. 1, the tape streamer drive 10 and the host computer 40 communicate information with each other through the SCSI interface 20 in the manner described above. The system controller 15 receives communications from the host computer 40 through the use of SCSI commands. The SCSI interface may be replaced alternatively by some other suitable interfacing arrangements, such as an IEEE 1394 interface.

Where the tape cassette 1 incorporating the contact type memory 104 shown in FIG. 3B is employed as the target tape cassette, the tape streamer drive 10 is provided with a connector block 45 that writes and reads data to and from the memory 104. The connector block 45 is shaped to fit the terminal block 106 shown in FIG. 4. When coupled to the terminal block 106, the connector block 45 electrically connects the five terminals 105A, 105B, 105C, 105D and 105E of the contact type memory 104 to the system controller 15 (i.e., to a memory connection port of the system controller).

When the electrical connection is established, the system controller 15 can access the contact type memory 104 of the loaded tape cassette 1 through the connector block 45 and terminal block 106. If the connector block 45 and terminal block 106 are poorly connected, the loading motor 14E may drive the loading mechanism to slightly shift the tape cassette 1 from its loaded position. Such readjustments are carried out as needed to establish proper physical contacts between the two blocks.

4. Magnetic Tape Format

What follows is a general description of a data format along the magnetic tape 3 in the tape cassette 1 to and from which the tape streamer drive 10 writes and reads data.

FIGS. 6A through 6D illustrate a typical structure of data recorded on the magnetic tape 3. FIG. 6A schematically shows a single magnetic tape 3. With this embodiment of the invention, each magnetic tape 3 may be divided into partitions for use on a partition-by-partition basis as depicted in FIG. 6A. Up to 256 partitions may be formed per tape and managed using partition numbers (partitions #0, #1, #2, etc.).

With this embodiment, data can be written and read to and from each partition independently of the other partitions. Illustratively, in a single partition depicted in FIG. 6B, data are shown recorded in units of a fixed length called a group, as indicated in FIG. 6C. In other words, data are written to the magnetic tape 3 in groups.

One group is equivalent to a data amount of 20 frames. One frame is formed by two tracks, as shown in FIG. 6D. The two tracks constituting each frame are a plus azimuth track and a minus azimuth track contiguous to each other. One group is thus made up of 40 tracks.

The single-track data structure in FIG. 6D is detailed in FIGS. 7A and 7B. FIG. 7A shows a data structure per block. One block is made up of a one-byte SYNC data area A1 in the leftmost position, followed by a six-byte ID area A2 for use in searches, a two-byte parity area A3 for ID data error correction, and a 64-byte data area A4, in that order.

The data per track shown in FIG. 7B are composed of 471 blocks in total. Each track has four-block margin areas A11 and A19 at both ends. The margin areas A11 and A19 are followed and preceded respectively by ATF areas A12 and A18 for tracking control. The ATF areas A12 and A18 are followed and preceded respectively by parity areas A13 and A17. Each parity area is formed by 32 blocks.

In the middle of a track is disposed an ATF area A15. The ATF areas A13, A15 and A18 are made up of five blocks each. A 192-block data area A14 is formed between the parity areas A13 and the ATF area A15, and another 192-block data area A16 is formed between the ATF area A15 and the parity area A17. Of the 471 blocks making up a single track, 384 blocks constitute the data areas A14 and A16 (192×2=384 blocks). One group composed of 40 tracks (=20 frames) as described above is physically recorded on the magnetic tape 3, as illustrated in FIG. 7C.

The magnetic tape 3 discussed above with reference to FIGS. 6A through 7C has data recorded thereon in an area structure depicted in FIGS. 8A, 8B and 8C. This representative structure is assumed to have N partitions numbered from #0 to #N−1.

As shown in FIG. 8A, the top of the magnetic tape is physically furnished with a leader tape, followed by a device area for use in the loading and unloading of the tape cassette. The beginning of the device area is called a PBOT (physical beginning of tape). The device area is followed by a reference area with regard to partition #0 and a system area that holds a tape use history and related data (the reference area and the system area are collectively called the system area hereunder). The system area is followed by a data area. The beginning of the system area is called a LBOT (logical beginning of tape).

The system area, as shown magnified in FIG. 8C, includes a reference area, a position tolerance band No. 1, a system preamble, a system log, a system postamble, a position tolerance band No. 2, and a vender group preamble.

The data area subsequent to the system area is shown magnified in FIG. 8B. As illustrated, at the top of the data area is written a vender group indicating information about the vender that first created and supplied data. The vender group is followed by a series of groups each structured as illustrated in FIG. 6C. In this example, group 1 through group (n) are shown to be formed consecutively. The last group (n) is followed by an amble frame.

Subsequent to the data area is an EOD (end of data) area indicating the end of the data area for the partition in question, as shown in FIG. 8A. If there were only one partition, the END of that partition #0 would represent an LEOT (logical end of tape). Since there are N partitions in this case, an optional device area is provided following the EOD of partition #0.

The device area subsequent to the PBOT is an area for use in the loading and unloading of the tape cassette with regard to partition #0. The optional device area at the end of partition #0 serves as an area for use in the loading and unloading of the tape cassette with respect to partition #1.

Partition #1 has the same area structure as partition #0. At the end of partition #1 is formed an optional device area for use in the loading and unloading of the tape cassette with regard to the next partition #2. The subsequent partitions up to partition #(N−1) are each given the same structure.

The last partition #(N−1) has no need for an optional device area and is not furnished therewith. The EOD of partition #(N−1) represents the LEOT (logical end of tape). A PEOT (physical end of tape) denotes the position where the physical tape or the partition in question physically ends.

5. MIC Data Structure

The structure of data to be stored in the MIC (remote memory chip 4 or contact type memory 104) will now be described. If the MIC is the remote memory chip 4, data are written to the EEPROM 4d. The contact type memory 104 includes illustratively a nonvolatile memory, not shown, which is equivalent to the EEPROM 4d and which has the data written thereto.

FIG. 9 schematically shows a typical structure of data held in the MIC. The storage area of the MIC has an MIC header and a memory free pool where diverse kinds of management information, such as items of information about manufacture of the tape cassette, tape information in effect upon initialization, and partition-wise information, are written.

The MIC header is topped by a 96-byte manufacture part that primarily retains various items of information about the manufacture of the tape cassette in question. The manufacture part is followed by a 64-byte signature, a 32-byte cartridge serial number, a 16-byte cartridge serial number CRC, a 16-byte scratch pad memory, a 16-byte mechanism error log, a 16-byte mechanism counter, and a 48-byte last 11 drive list, in that order. A 16-byte drive initialize part subsequent to the last 11 drive list mainly accommodates information in effect upon initialization.

A 112-byte volume information area subsequent to the drive initialize part holds basic management information about the tape cassette as a whole. The volume information is followed by a 64-byte accumulative system log that stores information about a history accumulated since the manufacture of the tape cassette. At the end of the MIC header is a 528-byte volume tag.

The memory free pool is an area to which management information can be added. This is an area where various items of information are stored or updated as needed in the course of write or read operations. Data are written to the memory free pool in units of data items called collectively a cell.

Where partitions are formed along the magnetic tape 3, partition information cells #0, #1, etc., are written as management information corresponding to the established partitions starting from the top of the memory free pool. That is, there are as many partition information cells written to the memory free pool as the number of partitions formed along the magnetic tape 3.

As shown in FIGS. 8A, 8B and 8C, the system log provided in the system area for each of the partitions #0, #1, etc. along the magnetic tape is arranged to hold the same information as that written to the partition information cells #0, #1, etc. in the MIC.

At the end of the memory free pool is written a super-high speed search map cell that constitutes map information for use in super-high speed searches. The super-high speed search map cell is preceded by a user volume note cell and user partition note cells. The user volume note cell is made up of information such as a comment entered by the user about the tape cassette as a whole. The user partition information cells hold such information as comments entered by the user about each of the partitions. These items of information are stored only when designated by the user; their storage in the memory is optional. Any intermediate area where such information is not written is left unused as a memory free pool area for future storage of information.

The manufacture part in the MIC header is structured illustratively as depicted in FIG. 10. The data items making up the manufacture part have their sizes in bytes shown in the rightmost column of FIG. 10. The manufacture part is topped by a one-byte manufacture part checksum that holds checksum information about the data in the manufacture part. This information is provided upon manufacture of this tape cassette.

Real data that constitute the manufacture part range from an MIC type to an offset. An indication "Reserved" denotes an area reserved for future storage of data. The same indication will have the same significance in the description that follows.

The MIC type is a data item that indicates the type of the MIC (remote memory chip 4) actually furnished in this tape cassette.

An MIC manufacture date represents the date (and time) of manufacture of this MIC.

An MIC manufacture line name provides information about the name of the line that manufactured the MIC.

An MIC manufacture plant name furnishes information about the name of the plant that manufactured the MIC.

An MIC manufacturer name gives information about the name of the manufacturer that manufactured the MIC.

An MIC name describes information about the name of the vender that marketed the MIC.

A cassette manufacture date, a cassette manufacture line name, a cassette manufacture plant name, a cassette manufacturer name, and a cassette name are data items that describe the corresponding items of information about the tape cassette.

An OEM customer name holds information about the name of an OEM (original equipment manufacturers) customer.

A physical tape characteristic ID denotes information about the physical characteristics of the magnetic tape, such as the material, thickness and length of the tape.

A maximum clock frequency provides information about a maximum clock frequency compatible with the MIC in question.

A block size describes information about a data length characteristic of the MIC (remote memory chip 4). This data item represents the data length in units of which data are transmitted at one time through the remote memory interface 30 and the RF interface 32.

An MIC capacity denotes information about the storage capacity of this MIC (remote memory chip 4).

A write protect top address represents the start address of a write-protect area allocated as part of the MIC.

A write protect count indicates the number of bytes in the write-protect area. That is, the write-protect area is allocated in a manner ranging from the start address designated by the write protect top address to the address indicated by this write protect count.

An application ID, shown as a one-byte data item, provides the ID of the application which, in this context, means a tape cassette type.

A two-byte area following the application ID serves as an offset.

Figure 11:
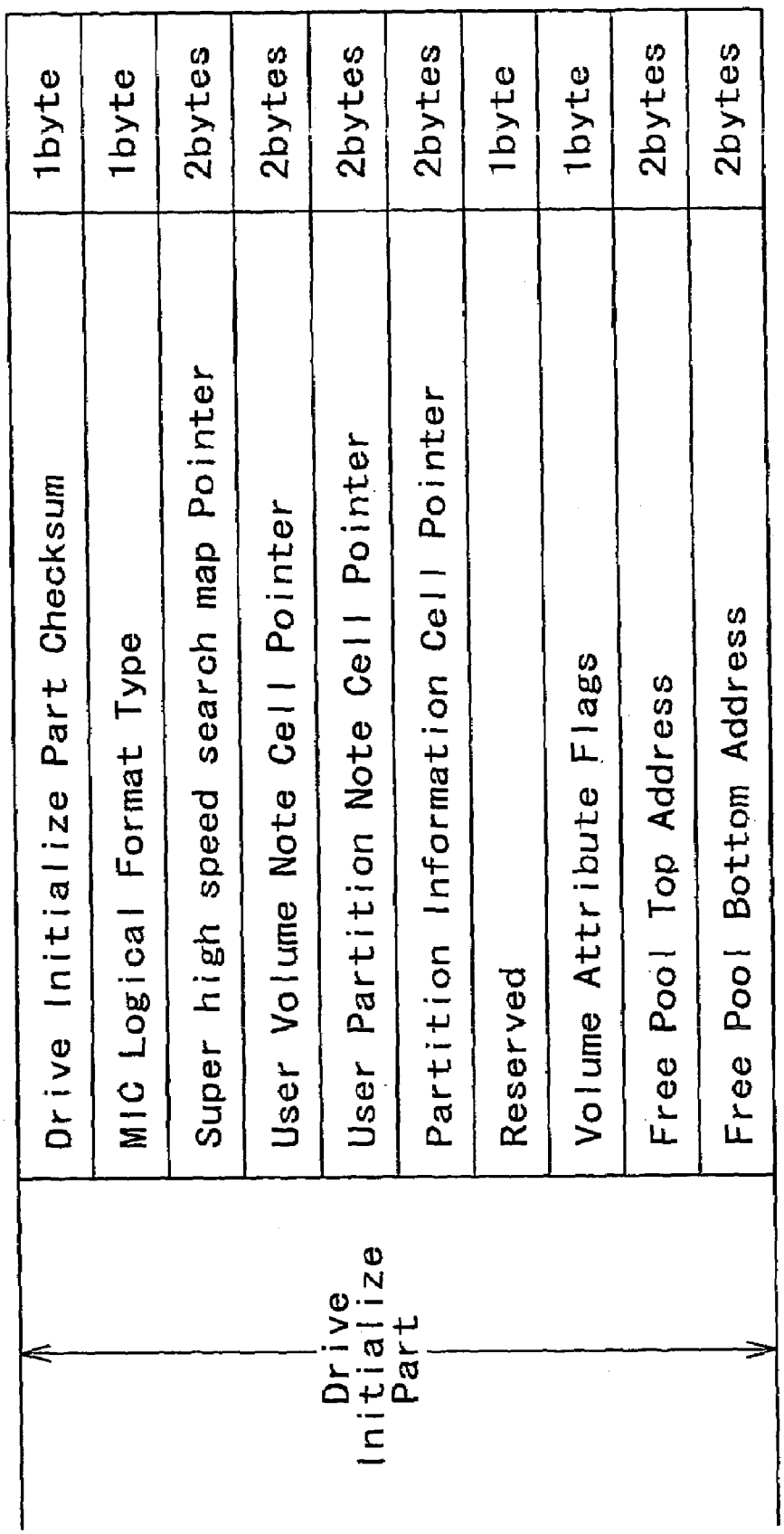
FIG. 11 is an explanatory view describing a drive initialize part of the MIC data structure according to the invention.

Described below with reference to FIG. 11 is how the drive initialize part in the MIC header is typically structured. The data items making up the drive initialize part have their sizes in bytes indicated in the rightmost column of FIG. 11.

The drive initialize part is topped by a drive initialize part checksum that holds checksum information about the data in the drive initialize part.

Real data that constitute the drive initialize part range from an MIC logical format type to a free pool bottom address.

The MIC logical format type contains an identifier identifying the format type of the magnetic tape 3. Upon shipment from the factory, the MIC logical format type is set with an identifier indicating this is a virgin (i.e., unformatted) tape cassette.

A super-high speed search map pointer points to the start address of a super-high speed search map cell shown in FIG. 9.

A user volume note cell pointer denotes the start address of the user volume note cell in FIG. 9, i.e., a storage area of the tape cassette to and from which the user may write and read data as desired through SCSI arrangements.

A user partition note cell pointer represents the start address of the user partition note cell or cells in FIG. 9, i.e., a storage area or areas to and from which the user may write and read data as desired through SCSI arrangements. Whereas there may exist a plurality of user partition note cells, the single user partition note cell pointer points to the start address of the first user partition note cell.

A partition information cell pointer denotes the start address of partition information cell #0 in FIG. 9. There are as many items of partition information written to the memory free pool as the number of partitions formed along the magnetic tape 3. All partition information cells #0 through #N are linked by pointers. That is, the partition information cell pointer serves as a root pointer indicating the address of partition #0. The pointers of the ensuing partition information cells are each included in the preceding partition information cell.

As described, the pointers (super-high speed map pointer, user volume note cell pointer, user partition node cell pointer, and partition information cell pointer) are used to manage the data locations in the memory free pool (a field FL4).

A volume attribute flag is a one-byte flag that serves as a logical write-protect tab used by the MIC 4.

A free pool top address and a free pool bottom address denote the current start address and end address of the memory free pool in the field FL4. Because the memory free pool as a storage area varies in locations depending on the writing and erasure of partition information and user partition notes, the free pool top address and the free pool bottom address are updated accordingly.

6. Data Structure of System Logs on the Magnetic Tape

Figure 12:
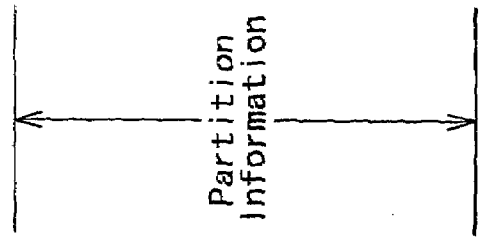
FIG. 12 is an explanatory view showing a typical system log according to the invention.
Figure 13:
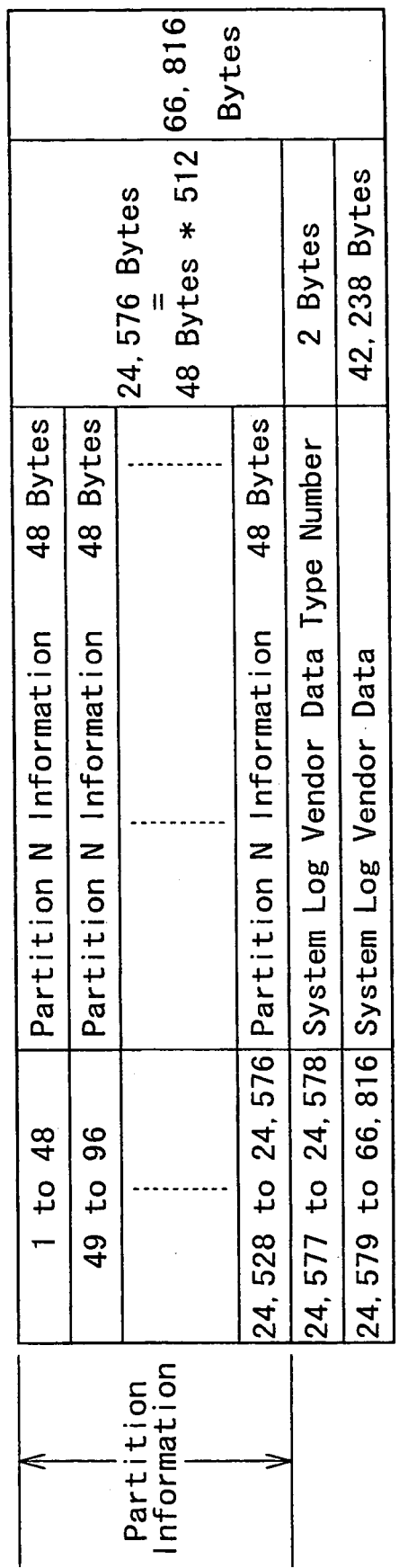
FIG. 13 is an explanatory view showing another typical system log according to the invention.

What follows is a description of the system log written in the system area on the magnetic tape 3. FIGS. 12 and 13 depict typical, overall, system log data structures. The system log shown in each of these figures includes system log vender data, as well as information about the partition to which the system log belongs. The system log vender data are made up of data necessary for the manufacturer (vender) that manufactured this tape cassette to manage the tape cassette and its MIC and to provide them with the vender's proprietary utility.

FIG. 12 depicts a data structure of the system log called type 0. In the case of a multiple partition tape format in which a plurality of partitions are allowed to be formed, the system log type 0 represents the structure of the system log furnished in the top partition. In the example of FIG. 8, the system log type 0 constitutes the system log for partition #0. In practice, a system made up of the tape streamer drive and the tape cassette according to this invention may adopt a single partition format involving only one partition formed on the magnetic tape. In this case, the system log is also constituted by the system log type 0 shown in FIG. 12.

FIG. 13 shows a data structure of the system log called type 1. Where the multiple partition tape format is in effect allowing a plurality of partitions to be formed, the system log type 1 represents the structure of the system log furnished in the partition following the top partition and in each of the subsequent partitions.

The system log type 0 in FIG. 12 has a total area of 66,816 bytes. The data size of the entire system log is determined in units of frames (see FIG. 6D) on the magnetic tape. In practice, hundreds of frames each taking on the structure of FIG. 12 are written consecutively on the tape to make up the system log. That is, the same system log data structured as shown in FIG. 12 are written may times over to constitute the system log area on the magnetic tape. This also applies to the system log type 1 depicted in FIG. 13.

In the system log type 0, a 12,228-byte area ranging from byte location 1 to byte location 12,228 makes up a partition information area that stores information about the partitions formed along the magnetic tape. As discussed above with reference to FIG. 6, the system embodying this invention may establish up to 256 partitions in a multiple partition format setup. In that setup, the partition information area is divided into 48-byte areas from byte location 1 onward, i.e., a partition 0 information area through a partition 255 information area. The partition 0 information area through the partition 255 information area each accommodate information regarding each of partitions #0 through #255. In a single partition format setup with only one partition allocated on the magnetic tape, only the partition 0 information area ranging from byte location 1 to byte location 48 is used as the partition information area.

A 72-byte area ranging from byte location 12,289 to byte location 12,360 subsequent to the partition information constitutes a volume information area. The volume information includes diverse kinds of information about the entire tape cassette.

The volume information is followed by a two-byte system log vender data type number area (byte locations 12,361 through 12,362) and a 54,454-byte system vender data area (byte locations 12,363 through 66,816). A value in the system log vender data type number area indicates the data content to be stored into the system log vender data area.

FIG. 14 depicts a structure of the volume information placed into the system log type 0 shown in FIG. 12. The volume information is topped by a one-byte MIC mode switch area whose definitions are given in FIG. 15. If the value in the MIC mode switch area is 0, then the tape cassette (cartridge) is intended for normal use. If the MIC is not recognized by the drive, the data in the system area recorded on the magnetic tape are allowed to be used. If the value in the MIC mode switch area is other than 0, that means a special use is stipulated in the management information about the tape cassette. That is, it is stipulated that only the MIC data be used as the management information in write or read operations on the tape cassette.

Described below are some typical cases in which the MIC mode switch area is set to any value other than 0 which requires the use of only the MIC data as the management information. Some tape cassettes utilized by this embodiment are intended for special uses other than for the usual data storage. For example, there is the so-called WORM cartridge having a WORM (Write Once Read Many) feature. Whereas the normal cartridge is designed for normal data write and read operations, the WORM cartridge is subject to overwrite restrictions: it is designed to have data written thereto only once. The written data can be reproduced from the WORM cartridge as needed but cannot be overwritten.

Since the WORM cartridge allows its written areas to be only read and not overwritten, it is impossible to update the management information regarding the written areas on the tape in a manner reflecting the past read operations. Such history information needs to be written to the nonvolatile memory inside the tape cassette. In other words, when a write or a read operation has been performed on the WORM tape cassette, it is mandatory to use not the management information recorded on the magnetic tape but its counterpart information held in the nonvolatile memory.

Whenever a WORM cartridge is in use, a value other than 0 is set to the MIC mode switch area. That is, when a special-use tape cassette (cartridge) different from the normal cartridge is loaded into the drive, any value other than 0 set in the MIC mode switch area gives absolute priority to access to the MIC rather than to the data written in the system area on the magnetic tape.

Returning to FIG. 14, the MIC mode switch area is followed by a three-byte reserved area. Subsequent to the reserved area is a two-byte physical tape characteristic ID area that gives information about physical tape characteristics. More specifically, the two bytes ranging from bit 15 to bit 0 making up this area contain the following information-carrying bits:

Bit 15: Enable bit
Bit 14: Magnetic layer
Bits 13, 12: Applied read head
Bit 11: Use extension area bit
Bits 10, 9, 8: Tape type
Bits 5, 4, 3, 2, 1, 0: Tape length/5

The physical tape characteristic ID area is followed by a one-byte flags area that accommodates flags necessary for write and read operations on the magnetic tape. Bits 7 through 0 making up the flags area are assigned the following flags:

Bits 7, 6, 5: Reserved. Set to all zero
Bit 4: Super-high speed search enable flag
Bits 3, 2: System log allocation flag
Bit 1: Always unload PBOT flag
Bit 0: DDS emulation flag The flags area is followed by a one-byte last partition number and a 32-byte device area map. The number of the last valid partition on the magnetic tape (last valid partition number) is set to the one-byte area. The device area map indicates data mapping in the device area. The remaining area of 32 bytes is reserved.

The MIC mode switch area in the volume information shown in FIG. 14 was conventionally allocated as an application ID area. As such, the area accommodated the same value as that of the application ID stored in the manufacture part of the MIC (see FIG. 10).

With this embodiment, the application ID area on the magnetic tape is changed into the MIC mode switch. As will be discussed later, a check is made to see if there is a match between the MIC mode switch value written on the magnetic tape on the one hand and the application ID value stored in the MIC as shown in FIG. 10 on the other hand. The check is intended to determine whether the same tape cassette type is designated by both the tape and the MIC. A mismatch between the two reveals an illegitimate cartridge.

FIG. 13 shows the structure of the system log type 1. As indicated, the system log type 1 as a whole makes up a 66,816-byte area, the same as the system log type 0. The data size of the entire system log type 1 is determined in units of frames on the magnetic tape. Hundreds of frames are written consecutively on the tape to make up the system log.

In the system log type 1, partition information is constituted by 512 consecutive partition N information areas of 48 bytes each, ranging from byte location 1 to byte location 24,576. Each of the partition N information areas accommodates relevant information about the corresponding partition.

The partition information is followed by a two-byte system log vender data type number (byte locations 24,577 through 24,578) and a 42,238-byte system log vender data area (byte locations 24,579 through 66,816). In this case, as in the case of the system log type 0, the value set in the system log vender data type number area indicates the data content to be stored into the system log vender data area.

As shown in FIG. 13, the system log type 1 does not have volume information. The absence is attributable simply to a particular formatting scheme used for this example. Alternatively, the system log type 1 may be formatted to accommodate a volume information area as well.

7. Fraud Preventing Measures

When the above-described WORM cartridge is loaded into the tape streamer drive of this embodiment, the recorded areas on the magnetic tape will not be overwritten or erased. The recorded areas can only be read, and data may be added only to unrecorded areas. That is, the write capability of the drive is restricted to a certain degree with regard to the WORM cartridge.

Since data of high storage value are expected to be recorded on the WORM cartridge, as described earlier, the WORM cartridge is required to provide a significantly higher level of security than the normal cartridge. The WORM cartridge is vulnerable to tampering. For example, one fraudulent case might involve a malicious user substituting an illicit memory for the initially furnished MIC in a given WORM cartridge in order to turn the latter into a normally rewritable cartridge. The recorded data on the tape could then be falsified. Another fraudulent case might involve illegally switching the MICs between special-purpose cartridges (tape cassettes) so that their original uses could be switched or otherwise diverted abusively.

Figure 16:
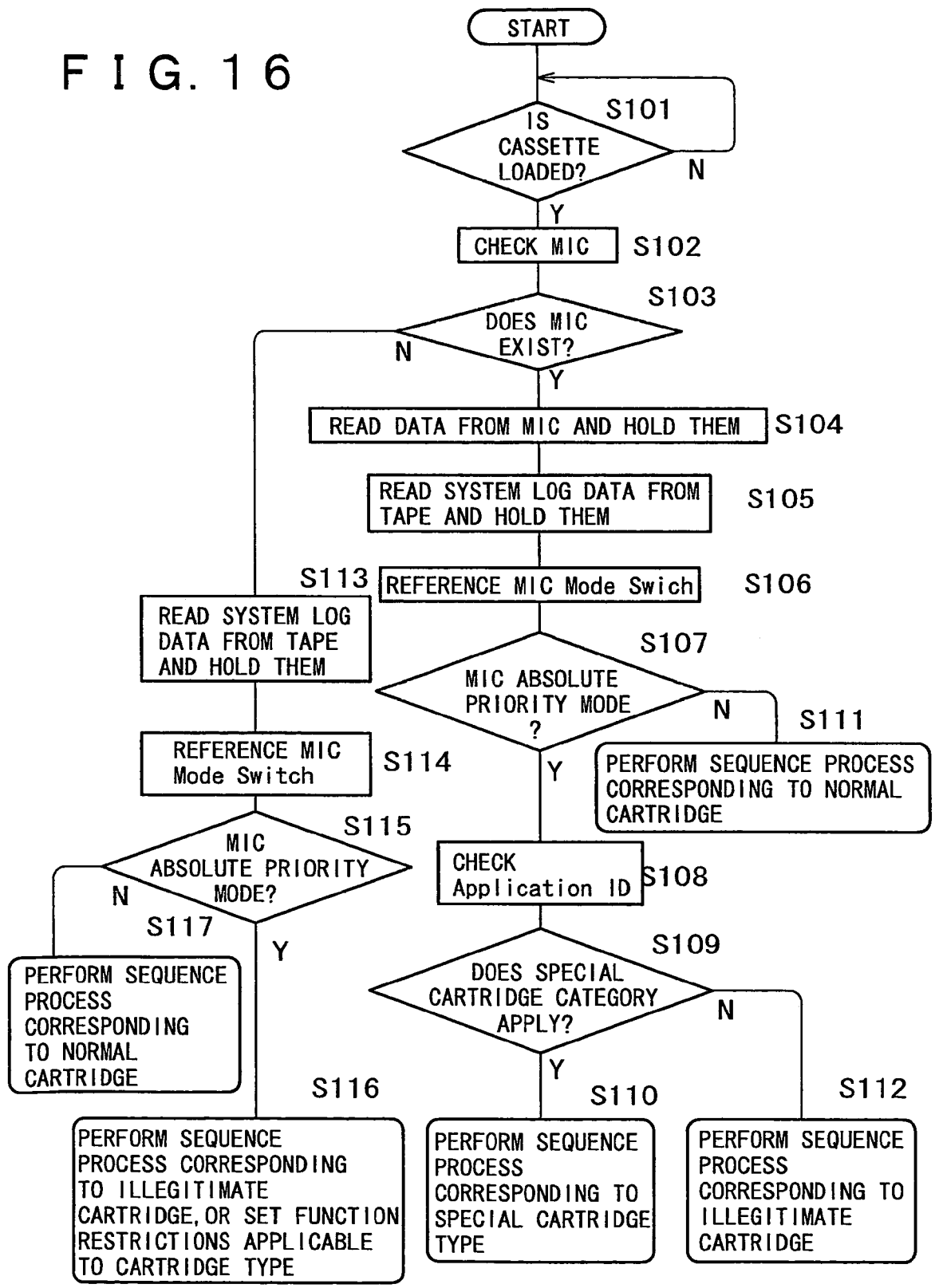
FIG. 16 is a flowchart of steps constituting an illegitimate cartridge handling process embodying the invention.

According to the invention, these fraudulent cases are circumvented by the tape streamer drive 10 illustratively carrying out the steps in the flowchart of FIG. 16. Specifically, the process in FIG. 16 is performed by the system controller 15 in the tape streamer drive 10.

In step S101, the system controller 15 first waits for a tape cassette (cartridge) to be loaded into the tape streamer drive 10. When the tape cassette is found to have been loaded, the system controller 15 goes to step S102.

If the loaded tape cassette has an MIC, the tape streamer drive 10 can gain access to that MIC. If the MIC is a remote memory chip 4, that chip can be accessed via the remote memory interface 30; if the MIC turns out to be a contact type memory 104, then the memory may be accessed through the connector block 45.

In step S102, an MIC check is carried out as one of the sequences that are executed upon loading of the tape cassette. The MIC check involves determining whether the MIC physically exists inside the loaded tape cassette. If the physical presence of the MIC is ascertained, then a check is made on the logical consistency of the data recorded in the MIC.

The check on the physical presence of the MIC is accomplished by determining whether communication is established with the MIC. Illustratively, the tape streamer drive 10 may transmit a predetermined command to the MIC in an attempt to gain access thereto. When a response to the command is received from the MIC, that response confirms the physical existence of the MIC. If the MIC is a contact type memory, the system controller 15 establishes an electrical connection with the MIC through the connector block 45, which typically involves potential changes. Detecting such variations in potential verifies the physical presence of the MIC.

The logical consistency check on the stored data in the MIC is performed by accessing the data area in the MIC to see whether the data content in that area has a format compatible with the system of this embodiment. If the format is found compatible with the system, that means the logical consistency of the MIC is ascertained; if the format is found incompatible with the system, the logical consistency of the data in the MIC cannot be confirmed.

In step S103, the system controller 15 determines whether the MIC check in the preceding step S102 revealed that the MIC exists. The result of the check in step S103 is affirmative only if two conditions are met at the same time: the MIC must physically exist; and the logical consistency of the data in the MIC must be verified. If either or both of the two conditions are not satisfied, the result of the check in step S103 is negative.

If the physical presence of the MIC has led to the affirmative result of the check in step S103, steps S104 and S105 are carried out successively. These are sequence processes to be executed upon loading of the tape cassette.

In step S104, the system controller 15 reads data from the MIC and places them illustratively into the SRAM 24. The data read at this point from the MIC are typically structured as shown in FIG. 9.

Although not shown as a control process here, the magnetic tape is loaded following the earlier loading of the tape cassette. The loaded tape is run until it is set to a position permitting access to the system log on the tape for log data retrieval. In step S105, at the time the access to the system log area on the magnetic tape is completed, the system log data are read from the tape and placed into the SRAM 24.

When the above sequences are finished, the SRAM 24 of the tape streamer drive 10 holds two kinds of data: data from the MIC housed in the loaded tape cassette, and data from the system log recorded on the magnetic tape.

When the MIC data from the tape cassette and the system log data from the magnetic tape both have been retrieved and placed into the SRAM 24, step S106 is reached. In step S106, the value of the MIC mode switch is referenced within the system log data read from the magnetic tape. As shown in FIGS. 12 and 14 above, the MIC mode switch is found in the volume information of the system log type 0 on the magnetic tape.

In step S107 following step S106, the system controller 15 checks to determine whether the MIC absolute priority mode is in effect. The check of step S107 is based on the MIC mode switch value referenced in the preceding step S106.

The MIC absolute priority mode is a mode into which the tape cassette in question requests the tape streamer drive 10 to go for operation. In this operation mode, absolute priority is given to the reading of data from the MIC upon access to that memory, as well as to the writing (update) of data to the MIC in a manner reflecting the use history so far, upon a write or read operation to or from the magnetic tape. In other words, unless and until the MIC is accessed, no data can be written to or read from the magnetic tape using the system area data from the magnetic tape in the MIC absolute priority mode.

That the MIC absolute priority mode is in effect is equivalent to the MIC mode switch value being other than 0, i.e., the tape cassette constituting a special-use cartridge. Where the MIC absolute priority mode is not found to be in force, that means the MIC mode switch value is 0 and the tape cassette is a normal cartridge.

Thus, if the MIC mode switch value referenced in step S106 has turned out to be 0, the result of the check in step S107 is negative (i.e., the MIC absolute priority mode is not in effect), which causes the system controller 15 to reach step S111. In this case, the tape cassette loaded in the tape streamer drive 10 is an MIC-equipped normal cartridge. In step S111, which is a sequence process to be carried out regarding a normal cartridge, the tape starts being run for access to a target tape position in which the ensuing data write or read operation is to be executed. After the target tape position is reached, the write or read operation and any other relevant operations are carried out as needed.

If the MIC mode switch value referenced in step S106 has turned out to be other than 0, the result of the check in step S107 is affirmative (i.e., the MIC absolute priority mode is in effect). This causes the system controller 15 to reach step S108.

In step S108, the system controller 15 reads and references the application ID from the MIC data held in the SRAM 24. As shown in FIG. 10, the application ID is set in a one-byte area in the manufacture part of the MIC. The application ID indicates the type of the tape cassette in question. For example, a particular value defined in the application ID denotes a normal cartridge. Where there exists a plurality of special-use cartridge types, each cartridge type is identified by a specific value of the application ID. When the loaded tape cassette is illustratively a WORM cartridge (i.e., one of the special-use cartridges), a relevant value set in the application ID indicates that the tape cassette is categorized as the WORM cartridge.

In step S109 following step S108, a check is made to determine whether the loaded tape cassette belongs to the special cartridge category. The check in step S109 is based on the result of the reference to the application ID in the preceding step S108.

In the process leading up to step S109, an operation mode in force has been recognized. That is, in step S107, the MIC mode switch as part of the data read from the magnetic tape showed that the MIC absolute priority mode is in effect (i.e., this is a special-use cartridge).

Suppose that the result of the check in step S109 is affirmative indicating that the loaded cartridge belongs to the special cartridge category. In this case, the MIC mode switch value from the magnetic tape indicates compliance with a special-use cartridge type and the application ID from the MIC also reveals compliance with the same cartridge type. That means there exists consistency between the magnetic tape and the MIC in terms of management information designating a special-use cartridge.

Since the tape cassette is found to be a legitimate special-use cartridge, the system controller 15 goes to step S110. In step S110, a sequence process is performed in accordance with the special cartridge type recognized from the application ID.

For example, if the loaded tape cassette has turned out to be a legitimate WORM cartridge, then step S110 is reached. In step S110, the system controller 15 establishes the MIC absolute priority mode, i.e., the operation mode corresponding to the WORM cartridge. In this mode, the upcoming write or read operation to or from the magnetic tape is always preceded by access to and retrieval of the data in the MIC, and not the system area data (management information) on the magnetic tape. The system controller 15 also sets restrictions inhibiting the recording of data to any data-recorded areas on the magnetic tape. With this restraint in effect, any command issued illustratively by the host computer 40 to overwrite the recorded areas on the tape with new data is canceled. What can only be done here is to write data once to unrecorded areas on the magnetic tape and to read data from the recorded areas on the tape.

If the result of the check in step S109 is negative because the tape cartridge in question is not found to be of any special cartridge type, then there exists a management data mismatch between the magnetic tape and its MIC. That is, the MIC mode switch on the magnetic tape indicates a special-use cartridge whereas the application ID in the MIC indicates something else (e.g., a normal cartridge).

With this embodiment, the MIC mode switch on the magnetic tape was allocated as a ROM area at the time of formatting. The MIC mode switch area is thus not overwritten normally by the tape streamer drive 10. Likewise, the application ID in the MIC makes up a ROM area that is not overwritten normally following the initial writing of data thereto upon shipment from the factory.

That the above inconsistency has been detected suggests strongly the possibility that the legitimate MIC was detached from the special-use cartridge and replaced by an illicit memory. It can be surmised that by replacing the original MIC, an unscrupulous party is trying to abuse the special-use cartridge in question as a normal cartridge.

In such a case, the system controller 15 goes to step S112 where a sequence process corresponding to an illegitimate cartridge is carried out. This sequence process involves establishing a mode that disables the tape streamer drive 10 in both the write and read operations. The user then has no choice but to have the loaded tape cassette ejected from the drive.

With the above mode established, it is impossible for the tape streamer drive 10 to write or read data to or from an illegitimate tape cassette whose original MIC has been tampered with. No data can be obtained from or falsified on the magnetic data in an illicit manner.

How this embodiment of the invention compares with its conventional counterpart is summarized below for reconfirmation. As mentioned earlier, the volume information on the magnetic tape traditionally accommodated not the MIC mode switch but the application ID. In other words, the check on the tape cassette to determine whether it is a special-use cartridge was based conventionally on the application ID both on the magnetic tape and in the MIC. Since the application ID is information which only allows the tape streamer drive 10 to identify the cartridge type and to make necessary settings accordingly, the use of the application ID alone is not sufficient in security terms in conjunction with the illegitimate cartridge handling process such as one shown in FIG. 16.

With the embodiment, the volume information recorded on the magnetic tape accommodates the MIC mode switch, which is different from the application ID held in the MIC. Because the MIC mode switch is information that can indicate whether this is a special-use cartridge requiring the MIC, the comparison of the application ID with the MIC mode switch for a match therebetween provides verification of possible tampering. This embodiment thus ensures security against fraudulent uses of the tape cassette.

Returning to FIG. 16, if the result of the check in step S103 is negative (i.e., if the MIC does not exist), the system controller 15 goes to step S113. In step S113, as in step S105, at the time the access to the system log area on the magnetic tape is completed, the system log data are read from the tape and placed into the SRAM 24.

In step S114, the system controller 15 accessing the SRAM 24 reads therefrom the MIC mode switch and references its value as part of the system log data retrieved from the magnetic tape. In step S115, the system controller 15 checks to determine whether the MIC absolute priority mode is in effect.

If the result of the check in step S115 is affirmative because the MIC absolute priority mode is found to be in effect, an inconsistency emerges: despite the physical absence of the MIC, the MIC mode switch on the magnetic tape carries the value denoting the MIC absolute priority mode. In this case, too, the loaded tape cassette is suspected of having been tampered with. Step S116 is then reached in which the sequence process corresponding to the illegitimate cartridge is performed as in the above-described step S112.

Step S116 also may be reached otherwise. This can occur if the result of the check earlier in step S103 was negative because the tape cartridge is a legitimate special-use cartridge but its MIC is defective and fails to communicate.

If that eventuality is taken into account, indiscriminately inhibiting data write or read operations to or from the illegitimate cartridge is not fair to the user. The measures taken in step S116 could then be mitigated provided the type of the special-use cartridge can be identified; it is possible to establish function restrictions applicable to the cartridge type in question.

For example, if the tape cassette turns out to be a WORM cartridge, carrying out step S116 may involve setting restrictions whereby the writing of data to both the recorded and unrecorded areas on the tape is disabled but data can be read from its recorded areas. This allows the user to limit losses resulting from a faulty MIC in a legitimate WORM cartridge because at least data can be read therefrom.

The type of special-use cartridge can be identified illustratively by use of an identification hole formed on the cartridge enclosure. If there are provided a plurality of special-use cartridge types from now on (currently, only one special-use cartridge type exists), all of these types are subject to the same function restrictions provided such restrictions will pose no problem to the users.

If the result of the check in step S11S is negative because the MIC absolute priority mode is not found to be in effect, that means one of two things: either the loaded tape cassette is a normal cartridge with no MIC; or the cassette is equipped with a MIC that is defective. In any case, the loaded tape cassette is a normal cartridge with or without the MIC. In this case, step S115 is followed by step S117 in which the sequence process corresponding to the normal cartridge is carried out as in step S111.

So far, the WORM cartridge has been cited as the representative example of the special-use cartridge. In the future, varieties of special-use cartridges are expected to be introduced. Each of these cartridge types can be dealt with by the process shown in FIG. 16. That is, the sequence process corresponding to the special-use cartridge in step S110 is carried out in a flexible manner applicable to the cartridge type identified in step S108 using the application ID.

Tampering with any of such special-use cartridge types (e.g., MIC replacement) leads either to the negative result of the check in step S109 or to the positive result of the check in step S115. In any case, it is possible to make arrangements such that write or read operations to or from the illegitimate cartridge will be disabled.

With this embodiment, the MIC mode switch information designating the MIC absolute priority mode is used to distinguish the normal cartridge from special-use cartridges. A single item of information constituted by the MIC mode switch contributes to providing security in a manner embracing diverse types of special-use cartridges.

Although the description above contains many specificities, these should not be construed as limiting the scope of the invention but as merely providing illustrations of some of the presently preferred embodiments of this invention. For example, the tape format and MIC data structure illustrated and described above may be modified in their details as needed. The tape drive apparatus of this invention is not limited to the tape streamer drive used for data storage; it can also be applied to tape drives for other purposes.

As described, the tape cassette as the recording medium of this invention is equipped with a memory capable of accommodating management information. Where the inventive tape cassette is used, condition information (MIC mode switch) is written to a predetermined area on the magnetic tape held in the cassette. That item of information specifies whether or not the use of the management information held in the MIC is mandatory upon a write or read operation to or from the magnetic tape.

Depending on the consistency checked between the condition information read from the magnetic tape on the one hand and a result of access to the memory on the other hand, the tape drive system controls write and read operations on the loaded tape cassette. If an inconsistency is detected, that is interpreted as something fraudulent having been committed on the tape cassette. In such a case, the read and write operations are controlled in such a manner that the use of the illegitimate tape cassette may be inhibited.

That is, according to this invention, the recording of the condition information to the magnetic tape is defined in advance and later utilized for the prevention of data falsification or other tampering with the tape cassette. The inventive scheme thus improves security of the tape drive system and enhances its reliability.

What is claimed is:

1. A tape drive apparatus comprising:

tape-oriented recording and/or reproducing means for recording and/or reproducing information to and/or from a magnetic tape housed in a tape cassette furnished as a recording medium, said tape cassette being loaded in the apparatus;

memory accessing means for accessing a memory which may be incorporated in said tape cassette separately from said magnetic tape, said memory holding management information for write and/or read operations to and/or from said magnetic tape, said memory accessing means writing and/or reading information to and/or from said memory following the accessing;

information acquiring means for acquiring conditional information from said magnetic tape by causing said tape-oriented recording and/or reproducing means to reproduce from the tape said conditional information, said conditional information indicating whether a memory priority mode is present, said memory priority mode indicating that said management information from said memory must be examined before writing and/or reading information to and/or from said magnetic tape; and operation controlling means which, based at least on consistency between specifics of the acquired conditional information and a result of suitable access to said memory by said memory accessing means when said memory priority mode is present, controls a write and/or a read operation on said magnetic tape.

2. A tape drive apparatus according to claim 1, wherein said operation controlling means determines, as a result of said access to said memory, specifics of type identification information which is held in said memory and which indicates a type of the loaded recording medium.

3. A tape drive apparatus according to claim 1, wherein said operation controlling means determines, as a result of said access to said memory, whether said memory inside said tape cassette has said management information stored thereon in a valid format.

4. The tape drive apparatus of claim 1, wherein the operation controlling means accommodates an illegitimate cartridge sequence where it is determined that the memory is absent and the memory priority mode is present.

5. The tape drive apparatus of claim 1, wherein the operation controlling means accommodates a normal cartridge sequence where it is determined that the memory is absent and the memory priority mode is absent.

6. The tape drive apparatus of claim 1, wherein the operation controlling means accommodates an illegitimate cartridge sequence where it is determined that the memory is present, the memory priority mode is present, and that there is an inconsistency between the management information on the memory and the magnetic tape.

7. The tape drive apparatus of claim 1, wherein the operation controlling means accommodates a special cartridge sequence where it is determined that the memory is present, the memory priority mode is present, and a consistency between the management information in the memory and the magnetic tape indicates that a special cartridge category is applicable.

8. A recording and/or reproducing method for use with a tape drive apparatus, the method comprising the steps of:

recording and/or reproducing information to and/or from a magnetic tape housed in a tape cassette furnished as a recording medium, said tape cassette being loaded in the apparatus;

accessing a memory which may be included in said tape cassette separately from said magnetic tape, said memory holding management information for write and/or read operations to and/or from said magnetic tape, said memory accessing step writing and/or reading information to and/or from said memory following the accessing;

acquiring conditional information from said magnetic tape by causing said recording and/or reproducing step to reproduce from the tape said conditional information, said conditional information indicating whether a memory priority mode is present, said memory priority mode indicating that said management information from said memory must be examined before writing and/or reading information to and/or from said magnetic tape; and based at least on consistency between specifics of the acquired conditional information and a result of suitable access to said memory in said memory accessing step when said memory priority mode is present, controlling a write and/or a read operation on said magnetic tape.

9. The method of claim 8, further comprising:

performing an illegitimate cartridge sequence where it is determined that the memory is absent and the memory priority mode is present.

10. The method of claim 8, further comprising:

performing a normal cartridge sequence where it is determined that the memory is absent and the memory priority mode is absent.

11. The method of claim 8, further comprising:

performing an illegitimate cartridge sequence where it is determined that the memory is present, the memory priority mode is present, and that there is an inconsistency between the management information on the memory and the magnetic tape.

12. The method of claim 8, further comprising:

performing a special cartridge sequence where it is determined that the memory is present, the memory priority mode is present, and a consistency between the management information in the memory and the magnetic tape indicates that a special cartridge category is applicable.

* * * * *